United States Patent [19]
Suzuki

[11] Patent Number: 5,253,243
[45] Date of Patent: Oct. 12, 1993

[54] RECORDING AND REPRODUCING TIMING GENERATING APPARATUS

[75] Inventor: Mikiyoshi Suzuki, Yokohama, Japan

[73] Assignee: Ricoh Company, Ltd., Tokyo, Japan

[21] Appl. No.: 740,433

[22] Filed: Aug. 5, 1991

[30] Foreign Application Priority Data

| Aug. 7, 1990 | [JP] | Japan | 2-207689 |
| Feb. 1, 1991 | [JP] | Japan | 3-031426 |
| Mar. 18, 1991 | [JP] | Japan | 3-077289 |
| Jul. 5, 1991 | [JP] | Japan | 3-191137 |
| Jul. 26, 1991 | [JP] | Japan | 3-209973 |

[51] Int. Cl.$^5$ .............................................. G11B 20/10
[52] U.S. Cl. ............................................ 369/48; 369/59
[58] Field of Search ............ 369/48, 44, 34, 124, 369/59; 360/51

[56] References Cited

U.S. PATENT DOCUMENTS 4,550,394 10/1985 Maeda et al. ........................ 369/58
4,710,909 12/1987 Tsuyoshi et al. .................. 369/44.34

FOREIGN PATENT DOCUMENTS 0090035 4/1988 Japan.
0244448 10/1988 Japan.

Primary Examiner—Donald McElheny, Jr.
Attorney, Agent, or Firm—Cooper & Dunham

[57] ABSTRACT

A recording and reproducing timing generating apparatus records a preamble signal constructed by a predetermined bit pattern in which there is no recording pit before and after at least one clock before recording data. The generating apparatus controls a delay time of a sampling clock signal based on differential data of reproducing data sampled at timings before and after the recording pit of the preamble signal. The generating apparatus also controls the delay time of the sampling clock signal based on differential data of the reproducing data sampled at timings before and after the clock mark.

13 Claims, 29 Drawing Sheets (a) PREAMBLE SIGNAL
(b) RECORDING PIT
(c) RF

RECORDING AND REPRODUCING TIMING GENERATING APPARATUS

BACKGROUND OF THE INVENTION

The present invention relates to a recording and reproducing timing generating apparatus which controls the phase of a sampling clock signal of reproducing data by a sampling servo system in which a servo pattern including a clock mark is recorded to a memory medium at a constant interval, and which controls a delay time of the sampling clock signal based on the voltage level of a reproducing signal sampled by the sampling clock signal.

For example, in a conventional magnetooptic disk drive unit, etc., the phase of a sampling clock signal of reproducing data is controlled by a sampling servo system. A sampling signal for measuring a phase delay amount is recorded in a predetermined region at a data-recording time. A delay time of the sampling clock signal is controlled on the basis of a reproducing voltage level of the sampling signal. Such a phase controller is proposed in Japanese Patent Application Laying Open (KOKAI) No. 63-244448 as a phase control circuit.

In general, an optical disk has a plurality of servo areas separated from a data area with respect to one track. As shown in FIG. 32, in each of these servo areas, a set of wobble pits and a clock pit are formed as a pre-format at a constant interval along a track to detect a tracking error. The set of wobble pits are formed such that the track is located between these wobble pits. The clock pit is formed to detect timings for recording and reproducing data.

The conventional recording and reproducing timing generating apparatus used in an optical disk drive unit and generating a recording/reproducing clock signal for recording and reproducing information with respect to the optical disk will next be described with reference to FIG. 33.

In FIG. 33, a reproducing signal S1 is reproduced by an unillustrated optical pickup device and is inputted to an A/D converter 101 and a pulsating circuit 102. The reproducing signal S1 inputted to the A/D converter 101 is then A/D-converted by a recording/reproducing clock signal described later.

The reproducing signal S1 inputted to the pulsating circuit 102 is changed by the pulsating circuit 102 to a pulse signal S2 corresponding to a bottom (or peak) position of the reproducing signal S1. This pulse signal S2 is inputted to a synchronous signal generating circuit (which is called a PLL circuit in the following description) 103 for making a recording/reproducing clock signal synchronized with the pulse signal S2.

The pulse signal S2 inputted to this PLL circuit 103 is then inputted to an AND circuit 104 for outputting only a pulse signal S2 of a reproducing signal (which is called a clock pit reproducing signal in the following description) S1a corresponding to the clock pit shown in FIG. 32 by a window signal S3 from a decoder described later. The pulse signal S2 outputted from this AND circuit 104 is inputted to a phase comparator (which is called PD in the following description) 105. The PD 105 compares a phase of the inputted pulse signal S2 with the phase of a clock signal generated from a voltage control oscillator (which is called VCO in the following description) described later, and provides a difference between these phases.

The PD 105 outputs a phase difference signal according to the detected phase difference to a filter 106. This filter 106 outputs a voltage signal based on this phase difference signal to the VCO 107. The VCO 107 generates a clock signal having a predetermined phase until the voltage signal is inputted to this VCO 107 from the filter 106. However, when the voltage signal is inputted to the VCO 107 from the filter 106, this VCO 107 corrects the phase of a clock signal generated by this voltage signal and generates a recording/reproducing clock signal S4.

This recording/reproducing clock signal S4 is inputted to the A/D converter 101 and is also inputted to unillustrated demodulating circuit and tracking signal detecting circuit, etc. Further, this recording/reproducing clock signal S4 is inputted to a counter 108. This counter 108 counts the number of clock signals and outputs counting data indicative of a pit position to a decoder 109. The decoder 109 decodes the counting data from the counter 108 and outputs a window signal S3 to the AND circuit 104 at a predetermined timing. The decoder 109 also outputs a feedback signal S5 to the PD 105.

The recording/reproducing clock signal S4 inputted to the A/D converter 101 is set to a timing signal for determining the timing of an A/D conversion of the reproducing signal S1 inputted to the A/D converter 101. Accordingly, it is necessary to conform a phase of the recording/reproducing clock signal S4 to a phase of the clock pit reproducing signal S1a in a bottom (or peak) position thereof.

However, in the above conventional phase control circuit, no sampling signal can be obtained when an electric signal is missing by a defect in a memory medium, etc., in an area for writing the sampling signal. Accordingly, it is impossible to control the phase of a clock signal for reading data so that many errors in read data are caused.

In the conventional recording/reproducing timing generating circuit shown in FIG. 33, a phase of the recording/reproducing clock signal S4 is changed by a change in delay time of the pulsating circuit 102 and a change in stationary phase difference of the PLL circuit 103. Accordingly, it is difficult to accurately conform the phase of the recording/reproducing clock signal S4 to that of the clock pit reproducing signal S1a in the bottom (or peak) position thereof.

For example, as shown in FIG. 32, when the delay time of the pulsating circuit 102 is set to T1, the pulse signal S2 outputted from the pulsating circuit 102 is generated at a timing shifted by the time T1 from a bottom (or peak) position of the clock pit reproducing signal S1a.

When the stationary phase difference of the PLL circuit 103 is set to T2, the recording/reproducing clock signal S4 shown in FIG. 32 is generated at a timing shifted by the time T2 with respect to the pulse signal S2. Accordingly, the recording/reproducing clock signal S4 is generated at a timing shifted by the time T1+T2 from the bottom (or peak) position of the clock pit reproducing signal S1a.

A tracking error is obtained by calculating a difference in voltage level between reproducing signals S1 corresponding to two wobble pits. However, as shown in FIG. 32, when reproducing signals S1b corresponding to the two wobble pits are detected by the recording/reproducing clock signal S4 shifted by the time T1+T2, detecting timings of these reproducing signals S1*b* are equal to timings W1 and W2 shifted by the time T1+T2 from bottom (or peak) positions of the reproducing signals S1*b*. Accordingly, it is impossible to accurately detect a voltage level of each of the reproducing signals S1*b*.

Therefore, no tracking error can be accurately detected and no light spot can be positioned with respect to a target track. Further, it is impossible to accurately detect the reproducing level of a data pit recorded in a data area. Accordingly, when no phase of the recording/reproducing clock signal is in conformity with that of the clock pit reproducing signal in the bottom (or peak) position thereof, it is impossible to suitably record and reproduce information.

SUMMARY OF THE INVENTION

It is therefore an object of the present invention to provide a recording and reproducing timing generating apparatus in which an influence of signal missing caused by a defect in a memory medium, etc. can be restrained and recorded data can be suitably reproduced, and it is possible to generate a recording/reproducing clock signal having a phase in conformity with the phase of a clock pit reproducing signal in a bottom position thereof before information is recorded and reproduced.

The object of the invention can be achieved by a recording and reproducing timing generating apparatus for controlling the phase of a sampling clock signal of reproducing data by a sampling servo system in which a servo pattern including a clock mark is recorded to a memory medium at a constant interval, the generating apparatus controlling a delay time of the sampling clock signal based on a level of a reproducing signal sampled by the sampling clock signal; the generating apparatus comprising delay data generating means for outputting a set value of the delay time of the sampling clock signal; differential data detecting means for detecting a difference in signal level between the reproducing data obtained at timings of sampling clock signals before and after a recording pit of the servo pattern; and control means for controlling the delay time of the sampling clock signal generated from the delay data generating means such that a detecting value of the differential data detecting means is set to a local minimum value.

The present invention also resides in a recording and reproducing timing generating apparatus for controlling the phase of a sampling clock signal of reproducing data by a sampling servo system in which a servo pattern including a clock mark is recorded to a memory medium at a constant interval, the generating apparatus controlling a delay time of the sampling clock signal based on a level of a reproducing signal sampled by the sampling clock signal; the generating apparatus comprising preamble recording means for recording a preamble signal constructed by a predetermined bit pattern in which there is no recording pit before and after at least one clock before recording data; delay data generating means for outputting a set value of the delay time of the sampling clock signal; differential data detecting means for detecting a difference in signal level between the reproducing data obtained at timings of sampling clock signals before and after the recording pit of the preamble signal; and control means for switching the delay time of the sampling clock signal by sequentially switching the set value of the delay time outputted from the delay data generating means when the preamble signal is detected; the control means calculating an optimum delay amount of the sampling clock signal based on differential data detected by the differential data detecting means; and the control means setting the delay amount of the sampling clock signal to the calculated optimum delay amount after the preamble signal is detected.

The present invention also resides in a recording and reproducing timing generating apparatus for controlling the phase of a sampling clock signal of reproducing data by a sampling servo system in which a servo pattern including a clock mark is recorded to a memory medium at a constant interval, the generating apparatus controlling a delay time of the sampling clock signal based on a level of a reproducing signal sampled by the sampling clock signal; the generating apparatus comprising preamble recording means for recording a preamble signal constructed by a predetermined bit pattern in which there is no recording pit before and after at least one clock before recording data; delay data generating means for outputting a set value of the delay time of the sampling clock signal; differential data detecting means for detecting a difference in signal level between the reproducing data obtained at timings of sampling clock signals before and after the recording pit of the preamble signal; differential data average value calculating means for calculating an average value of differential data detected by the differential data detecting means with respect to a predetermined number of sampling clock signals; and control means for switching the delay time of the sampling clock signal by sequentially switching the set value of the delay time outputted from the delay data generating means in a unit of the predetermined number of sampling clock signals when the preamble signal is detected; the differential data average value calculating means calculating the average value by a control operation of the control means in accordance with a switching timing of the set value of the delay time; the control means calculating an optimum delay amount of the sampling clock signal based on the average value of the differential data calculated by the differential data average value calculating means; and the control means setting the delay amount of the sampling clock signal to the calculated optimum delay amount after the preamble signal is detected.

The present invention also resides in a recording and reproducing timing generating apparatus for controlling the phase of a sampling clock signal of reproducing data by a sampling servo system in which a servo pattern including a clock mark is recorded to a memory medium at a constant interval, the generating apparatus controlling a delay time of the sampling clock signal based on a level of a reproducing signal sampled by the sampling clock signal; the generating apparatus comprising preamble recording means for recording a preamble signal constructed by a predetermined bit pattern in which there is no recording pit before and after at least one clock before recording data; delay data generating means for outputting a set value of the delay time of the sampling clock signal; differential data detecting means for detecting a difference in signal level between the reproducing data obtained at timings of sampling clock signals before and after the recording pit of the preamble signal; differential data judging means for judging that a value shown by differential data outputted from the differential data detecting means is located in a predetermined range; control means for switching the delay time of the sampling clock signal by sequentially switching the set value of the delay time outputted from the delay data generating means when the preamble signal is detected; the control means calculating an optimum delay amount of the sampling clock signal based on differential data outputted from the differential data detecting means when there is a judging output from the differential data judging means; and the control means setting the delay amount of the sampling clock signal to the calculated optimum delay amount after the preamble signal is detected.

The present invention also resides in a recording and reproducing timing generating apparatus for controlling the phase of a sampling clock signal of reproducing data by a sampling servo system in which a servo pattern including a clock mark is recorded to a memory medium at a constant interval, the generating apparatus controlling a delay time of the sampling clock signal based on a level of a reproducing signal sampled by the sampling clock signal; the generating apparatus comprising preamble recording means for recording a preamble signal constructed by a predetermined bit pattern in which there is no recording pit before and after at least one clock before recording data; delay data generating means for outputting a set value of the delay time of the sampling clock signal; differential data detecting means for detecting a difference in signal level between the reproducing data obtained at timings of sampling clock signals before and after the recording pit of the preamble signal; differential data judging means for judging that a value shown by differential data outputted from the differential data detecting means is located in a predetermined range; control means for switching the delay time of the sampling clock signal by sequentially switching the set value of the delay time outputted from the delay data generating means when the preamble signal is detected and there is a judging output from the differential data judging means; the control means calculating an optimum delay amount of the sampling clock signal based on differential data outputted from the differential data detecting means; and the control means setting the delay amount of the sampling clock signal to the calculated optimum delay amount after the preamble signal is detected.

The present invention also resides in a recording and reproducing timing generating apparatus for controlling the phase of a sampling clock signal of reproducing data by a sampling servo system in which a servo pattern including a clock mark is recorded to a memory medium at a constant interval, the generating apparatus controlling a delay time of the sampling clock signal based on a level of a reproducing signal sampled by the sampling clock signal; the generating apparatus comprising preamble recording means for recording a preamble signal constructed by a predetermined bit pattern in which there is no recording pit before and after at least one clock before recording data; delay data generating means for outputting a set value of the delay time of the sampling clock signal; differential data detecting means for detecting a difference in signal level between the reproducing data obtained at timings of sampling clock signals before and after the recording pit of the preamble signal; differential data average calculating means for calculating an average value of differential data detected by the differential data detecting means with respect to a predetermined number of sampling clock signals; differential data judging means for judging that a value shown by differential data outputted from the differential data detecting means is located in a predetermined range; and control means for switching the delay time of the sampling clock signal by sequentially switching the set value of the delay time outputted from the delay data generating means in a unit of the predetermined number of sampling clock signals when the preamble signal is detected; the differential data average value calculating means calculating the average value by a control operation of the control means in accordance with a switching timing of the set value of the delay time when there is a judging output from the differential data judging means; the control means calculating an optimum delay amount of the sampling clock signal based on the average value of the differential data calculated by the differential data average value calculating means; and the control means setting the delay amount of the sampling clock signal to the calculated optimum delay amount after the preamble signal is detected.

The present invention also resides in a recording and reproducing timing generating apparatus for controlling the phase of a sampling clock signal of reproducing data by a sampling servo system in which a servo pattern including a clock mark is recorded to a memory medium at a constant interval, the generating apparatus controlling a delay time of the sampling clock signal based on a voltage level of a reproducing signal sampled by the sampling clock signal; the generating apparatus comprising preamble recording means for recording a preamble signal constructed by a predetermined bit pattern in which there is no recording pit before and after at least one clock before recording data; delay data generating means for outputting a set value of the delay time of the sampling clock signal; differential data detecting means for detecting a difference in signal level between the reproducing data obtained at timings of sampling clock signals before and after the recording pit of the preamble signal; differential data average value calculating means for calculating an average value of differential data detected by the differential data detecting means with respect to a predetermined number of sampling clock signals; differential data judging means for judging that a value shown by differential data outputted from the differential data detecting means is located in a predetermined range; and control means for switching the delay time of the sampling clock signal by sequentially switching the set value of the delay time outputted from the delay data generating means in a unit of the predetermined number of sampling clock signals when the preamble signal is detected and there is a judging output from the differential data judging means; the differential data average value calculating means calculating the average value by a control operation of the control means in accordance with a switching timing of the set value of the delay time; the control means calculating an optimum delay amount of the sampling clock signal based on the average value of the differential data calculated by the differential data average value calculating means; and the control means setting the delay amount of the sampling clock signal to the calculated optimum delay amount after the preamble signal is detected.

The present invention also resides in a recording and reproducing timing generating apparatus for controlling the phase of a sampling clock signal of reproducing data by a sampling servo system in which a servo pattern including a clock mark is recorded to a memory medium at a constant interval, the generating apparatus controlling a delay time of the sampling clock signal based on a level of a reproducing signal sampled by the sampling clock signal; the generating apparatus comprising preamble recording means for recording a preamble signal constructed by a predetermined bit pattern in which there is no recording pit before and after at least one clock before recording data; delay data generating means for outputting a set value of the delay time of the sampling clock signal; differential data detecting means for detecting a difference in signal level between the reproducing data obtained at timings of sampling clock signals before and after the recording pit of the preamble signal; differential data average value calculating means for calculating an average value of differential data detected by the differential data detecting means with respect to a predetermined number of sampling clock signals; pattern detecting means for detecting the preamble signal pattern shown by the reproducing data; and control means for switching the delay time of the sampling clock signal by sequentially switching the set value of the delay time outputted from the delay data generating means in a unit of the predetermined number of sampling clock signals when the preamble signal is detected; the differential data average value calculating means calculating the average value by a control operation of the control means in accordance with a switching timing of the set value of the delay time when there is a detecting output from the pattern detecting means; the control means calculating an optimum delay amount of the sampling clock signal based on the average value of the differential data calculated by the differential data average value calculating means; and the control means setting the delay amount of the sampling clock signal to the calculated optimum delay amount after the preamble signal is detected.

The present invention also resides in a recording and reproducing timing generating apparatus for controlling the phase of a sampling clock signal of reproducing data by a sampling servo system in which a servo pattern including a clock mark is recorded to a memory medium at a constant interval, the generating apparatus controlling a delay time of the sampling clock signal based on a level of a reproducing signal sampled by the sampling clock signal; the generating apparatus comprising preamble recording means for recording a preamble signal constructed by a predetermined bit pattern in which there is no recording pit before and after at least one clock before recording data; delay data generating means for outputting a set value of the delay time of the sampling clock signal; differential data detecting means for detecting a difference in signal level between the reproducing data obtained at timings of sampling clock signals before and after the recording pit of the preamble signal; differential data average value calculating means for calculating an average value of differential data detected by the differential data detecting means with respect to a predetermined number of sampling clock signals, pattern detecting means for detecting the preamble signal pattern shown by the reproducing data; and control means for switching the delay time of the sampling clock signal by sequentially switching the set value of the delay time outputted from the delay data generating means in a unit of the predetermined number of sampling clock signals when the preamble signal is detected and there is a detecting output from the pattern detecting means; the differential data average value calculating means calculating the average value by a control operation of the control means in accordance with a switching timing of the set value of the delay time; the control means calculating an optimum delay amount of the sampling clock signal based on the average value of the differential data calculated by the differential data average value calculating means; and the control means setting the delay amount of the sampling clock signal to the calculated optimum delay amount after the preamble signal is detected.

The present invention also resides in a recording and reproducing timing generating apparatus for controlling the phase of a sampling clock signal of reproducing data by a sampling servo system in which a servo pattern including a clock mark is recorded to a memory medium at a constant interval, the generating apparatus controlling a delay time of the sampling clock signal based on a level of a reproducing signal sampled by the sampling clock signal; the generating apparatus comprising preamble recording means for recording a preamble signal constructed by a predetermined bit pattern in which there is no recording pit before and after at least one clock before recording data; delay data generating means for outputting a set value of the delay time of the sampling clock signal; differential data detecting means for detecting a difference in signal level between the reproducing data obtained at timings of sampling clock signals before and after the recording pit of the preamble signal; differential data average value calculating means for calculating an average value of differential data detected by the differential data detecting means with respect to a predetermined number of sampling clock signals; pattern detecting means for detecting the preamble signal pattern shown by a binary signal obtained by binary processing of the reproducing signal; and control means for switching the delay time of the sampling clock signal by sequentially switching the set value of the delay time outputted from the delay data generating means in a unit of the predetermined number of sampling clock signals when the preamble signal is detected; the differential data average value calculating means calculating the average value by a control operation of the control means in accordance with a switching timing of the set value of the delay time when there is a detecting output from the pattern detecting means; the control means calculating an optimum delay amount of the sampling clock signal based on the average value of the differential data calculated by the differential data average value calculating means; and the control means setting the delay amount of the sampling clock signal to the calculated optimum delay amount after the preamble signal is detected.

The present invention also resides in a recording and reproducing timing generating apparatus for controlling the phase of a sampling clock signal of reproducing data by a sampling servo system in which a servo pattern including a clock mark is recorded to a memory medium at a constant interval, the generating apparatus controlling a delay time of the sampling clock signal based on a level of a reproducing signal sampled by the sampling clock signal; the generating apparatus comprising preamble recording means for recording a preamble signal constructed by a predetermined bit pattern in which there is no recording pit before and after at least one clock before recording data; delay data generating means for outputting a set value of the delay time of the sampling clock signal; differential data detecting means for detecting a difference in signal level between the reproducing data obtained at timings of sampling clock signals before and after the recording pit of the preamble signal; differential data average value calculating means for calculating an average value of differential data detected by the differential data detecting means with respect to a predetermined number of sampling clock signals; pattern detecting means for detecting the preamble signal pattern shown by a binary signal obtained by binary processing of the reproducing signal; and control means for switching the delay time of the sampling clock signal by sequentially switching the set value of the delay time outputted from the delay data generating means in a unit of the predetermined number of sampling clock signals when the preamble signal is detected and there is a detecting output from the pattern detecting means; the differential data average value calculating means calculating the average value by a control operation of the control means in accordance with a switching timing of the set value of the delay time; the control means calculating an optimum delay amount of the sampling clock signal based on the average value of the differential data calculated by the differential data average value calculating means; and the control means setting the delay amount of the sampling clock signal to the calculated optimum delay amount after the preamble signal is detected.

The present invention also resides in a recording and reproducing timing generating apparatus comprising an A/D converter for A/D-converting a reproducing signal of a pit for detecting recording and reproducing timings and recorded in advance at a constant interval in a track of an optical disk; a pulsating circuit for pulsating the reproducing signal of the pit and generating a pulse signal; and a synchronous signal generating circuit for generating a recording/reproducing clock signal synchronized with the pulse signal; the generating apparatus further comprising a variable delay section for delaying the pulse signal; a differential arithmetic circuit for calculating a difference in value between reproducing signals A/D-converted by recording/reproducing clock signals just before and just after the pit; and a control section for correcting a delay amount of the pulse signal in the variable delay section based on calculated results of the differential arithmetic circuit such that the difference is equal to zero.

This recording and reproducing timing generating apparatus further comprises a differential integrating circuit for calculating the difference in voltage value between the reproducing signals A/D-converted by the recording/reproducing clock signals just before and just after the pit, and the differential integrating circuit calculates this difference by a plurality of times and integrates the calculated differential results with each other; and the control section calculates an average value of the calculated differential results of the differential integrating circuit and corrects the delay amount of the variable delay section such that this average value is set to zero.

In the above-mentioned structures, the delay amount of a sampling clock signal is controlled on the basis of differential data of reproducing data sampled at timings before and after a recording pit of a preamble signal and a recording pit of a clock mark signal. Accordingly, the delay amount of the sampling clock signal can be suitably controlled even when no recording pit can obtained. Further, no differential data are used when a recording defect is caused in a recording region of the preamble signal and the differential data having a large error are obtained. Accordingly, it is possible to more accurately control the delay amount of the sampling clock signal. Further, the phase of a recording/reproducing clock signal can be changed by transmitting a pulse signal through a variable delay section for changing the delay amount in accordance with a delay amount of the variable delay section.

A difference in value between reproducing signals A/D-converted by recording/reproducing clock signals just before and just after a clock pit is calculated to correct the delay amount of the variable delay section such that this difference shows value zero. Thus, the phase of a reproducing signal corresponding to a bottom (or peak) position of the clock pit can be conformed to that of the recording/reproducing clock signal.

As mentioned above, in accordance with the present invention, the delay amount of a sampling clock signal is controlled on the basis of differential data of reproducing data sampled at timings before and after a recording pit of a preamble signal and a recording pit of a clock mark signal. Accordingly, the delay amount of the sampling clock signal can be suitably controlled even when no recording pit can obtained. Further, no differential data are used when a recording defect is caused in a recording region of the preamble signal and the differential data having a large error are obtained. Accordingly, it is possible to more accurately control the delay amount of the sampling clock signal. Further, the phase of a recording/reproducing clock signal can be changed by transmitting a pulse signal through a variable delay section for changing the delay amount in accordance with a delay amount of the variable delay section. A difference in voltage value between reproducing signals A/D-converted by recording/reproducing clock signals just before and just after a clock pit is calculated to correct the delay amount of the variable delay section such that this difference shows value zero. Thus, the phase of a reproducing signal corresponding to a bottom (or peak) position of the clock pit can be conformed to that of the recording/reproducing clock signal.

Further objects and advantages of the present invention will be apparent from the following description, reference being had to the accompanying drawings wherein preferred embodiments of the present invention are clearly shown.

DESCRIPTION OF THE PREFERRED EMBODIMENT

The preferred embodiments of a recording and reproducing timing generating apparatus in the present invention will next be described in detail with reference to the accompanying drawings.

Figure 1:
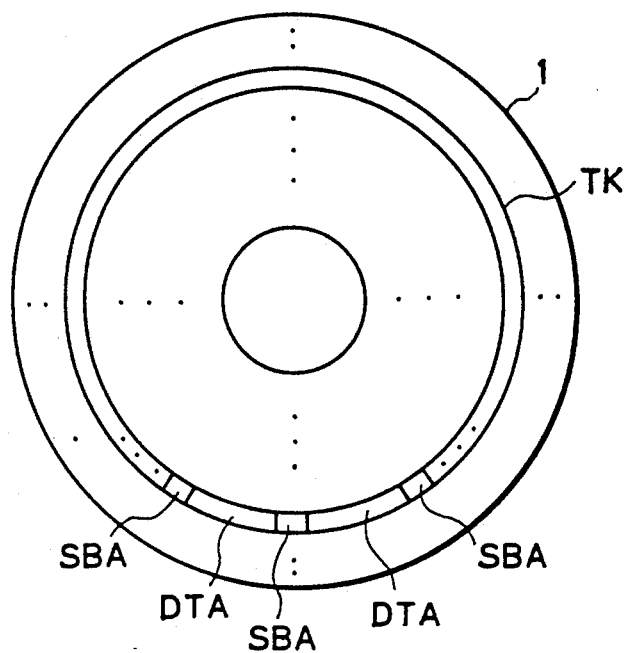
FIG. 1 is a schematic view showing one example of the track structure of a magnetooptic disk.

FIG. 1 shows a magnetooptic disk used in the embodiments of the present invention.

Figure 2:
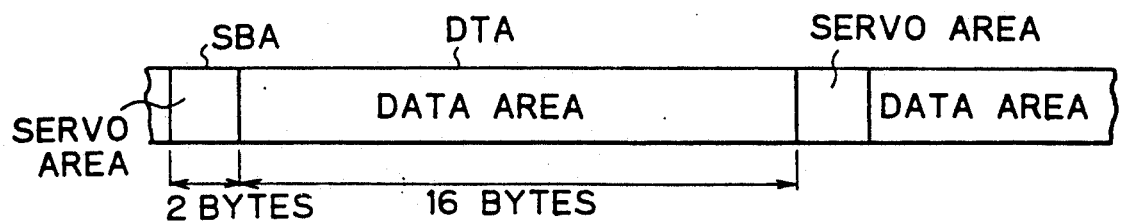
FIG. 2 is a schematic view illustrating the relation between a servo area and a data area.

A concentric recording track TK is formed on this magnetooptic disk 1 at a predetermined pitch. The magnetooptic disk 1 is rotated at a constant angular velocity. As shown in FIG. 2, a servo area SBA and a data area DTA are alternately arranged in this recording track TK. The servo area SBA has a two-byte length for sampling servo and the data area DTA has a sixteen-byte length.

Figure 3:
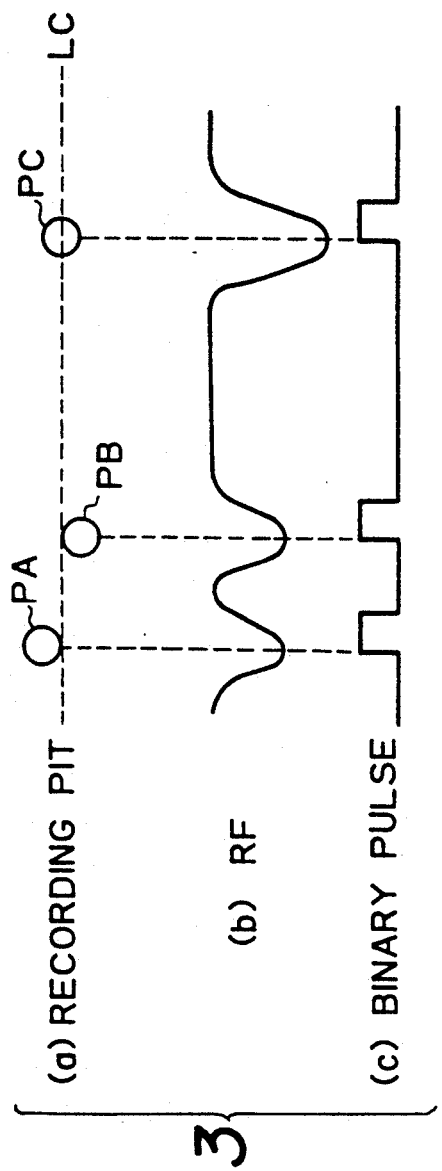
FIG. 3 is a schematic view showing one example of a servo pattern.

As shown by item (a) in FIG. 3, pits PA, PB and PC are recorded in the servo area SBA. The pits PA and PB are arranged in a zigzag shape such that these pits PA and PB come in contact with a central line LC of the recording track TK and are located on sides of this central line opposite to each other. The pit PC is arranged such that a center of this pit PC is located on the central line LC of the recording track TK.

As shown by item (b) in FIG. 3, a tracking error in unillustrated laser beam of an unillustrated optical pickup is detected on the basis of reproducing voltage levels of a reproducing signal RF at timings of the pits PA and PB. Tracking servo control for conforming the laser beam to the central line LC of the recording track TK is performed on the basis of this tracking error.

Further, phase control of a sampling clock signal (described later) for sampling the reproducing signal RF is performed on the basis of a reproducing voltage level of the reproducing signal RF at a timing of the pit PC.

A focusing error in the laser beam of the optical pickup is detected at an intermediate timing between the timings of the pits PA, PB and the pit PC. Focusing servo control for conforming a focal point of the laser beam to the recording track TK is performed on the basis of this focusing error.

Figure 4A:
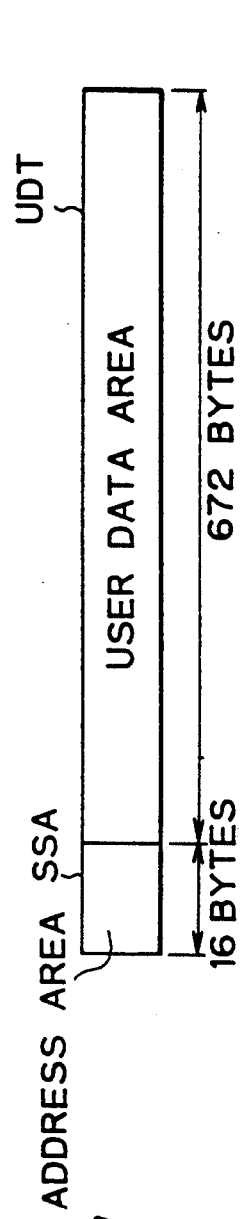
FIG. 4 is a schematic view showing one example of a data form of a sector and one example of data recorded to an address area.

The data area DTA is divided into a predetermined number of sectors (e.g., 32 sectors) having a predetermined length. As shown in FIG. 4a, each of these sectors is composed of an address area SSA for discriminating each sector and constructed by e.g., 16 bytes, and a user data area UDT having a predetermined data length constructed by e.g., 672 bytes.

Figure 4B:
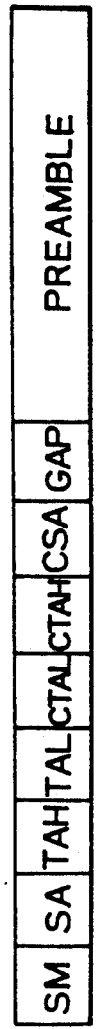

As shown in FIG. 4b, the address area SSA is constructed by a sector mark SM composed of a predetermined bit pattern showing the head of a sector, and a sector address SA set as an address for discriminating the sector. The address area SSA is also constructed by track address upper digit information TAH showing an upper digit of a track address for discriminating the recording track TK. The address area SSA is also constructed by track address lower digit information TAL showing a lower digit of the track address. The address area SSA is also constructed by track address lower digit inverted information CTAL for setting inverted data of a bit pattern of the track address lower digit information TAL. These inverted data show a complement of value one. The address area SSA is also constructed by track address upper digit inverted information CTAH for setting inverted data of a bit pattern of the track address upper digit information TAH. The address area SSA is also constructed by sector address inverted information CSA for setting inverted data of a bit pattern of the sector address SA. The address area SSA is also constructed by a gap GAP having one-byte length and a preamble signal having an eight-byte length and composed of a predetermined bit pattern.

The track address lower digit inverted information CTAL, the track address upper digit inverted information CTAH, and the sector address inverted information CSA are set to inspect respective contents of the track address lower digit information TAL, the track address upper digit information TAH, and the sector address SA.

Figure 5:
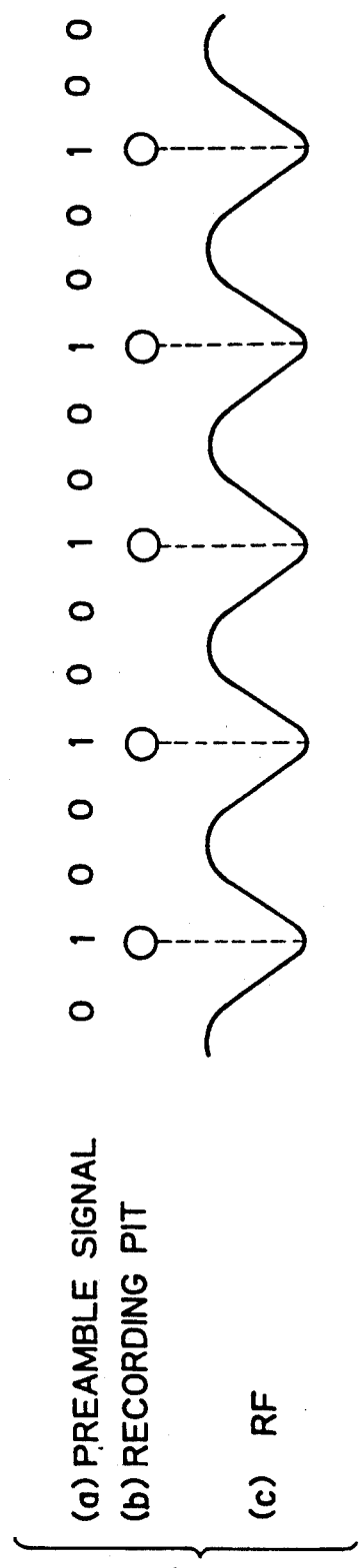
FIG. 5 is a schematic view showing one example of a preamble signal.

The bit pattern of the preamble signal is a data pattern formed such that no recording pit appears in a space constructed by at least one clock before and after the recording pit of this preamble signal. For example, as shown by item (a) in FIG. 5, this bit pattern is composed of "0100100100100100 --- ". In this case, a recording modulation rule for forming the recording pit with respect to data one is used as shown by item (b) in FIG. 5. A reproducing signal RF is obtained by reproducing the recording pit of this preamble signal and is changed as shown by item (c) in FIG. 5.

With respect to data recorded in the address area SSA, the sector mark SM, the sector address SA, the track address upper digit information TAH, the track address lower digit information TAL, the track address lower digit inverted information CTAL, the track address upper digit inverted information CTAH, and the sector address inverted information CSA are recorded onto the magnetooptic disk 1 in advance. The preamble signal is recorded onto the magnetooptic disk 1 by using the optical pickup device used for data record just before recorded data are written to the disk at a data-recording time.

The preamble signal is continuously recorded by the same system as a data-recording system. Accordingly, the phase of a sampling clock signal with respect to the preamble signal is equal to the phase of a sampling clock signal of the recorded data. This phase of the sampling clock signal with respect to the preamble signal is controlled by using a rise end of a binary signal (a clock mark) provided as a reference by binary processing of the reproducing signal RF of the pit PC in the servo area SBA.

At a data-reproducing time, the reproducing signal RF is basically sampled by using the sampling clock signal controlled in phase by using the rise end of the binary signal (the clock mark) provided as a reference by the binary processing of the reproducing signal RF of the pit PC in the servo area SBA, thereby forming reproducing data.

An error in phase between the sampling clock signals at the data-reproducing time and the data-recording time is caused by an operating state of the data-recording system at the data-recording time, a peak shift included in the formed clock mark, etc. Accordingly, the phase of the sampling clock signal is finely adjusted by detecting the preamble signal to use this sampling clock signal at the data-reproducing time in the next user data area UDT.

The fine adjustment of the phase of the sampling clock signal in the present invention will next be described with reference to FIGS. 6 and 7.

Figure 6:
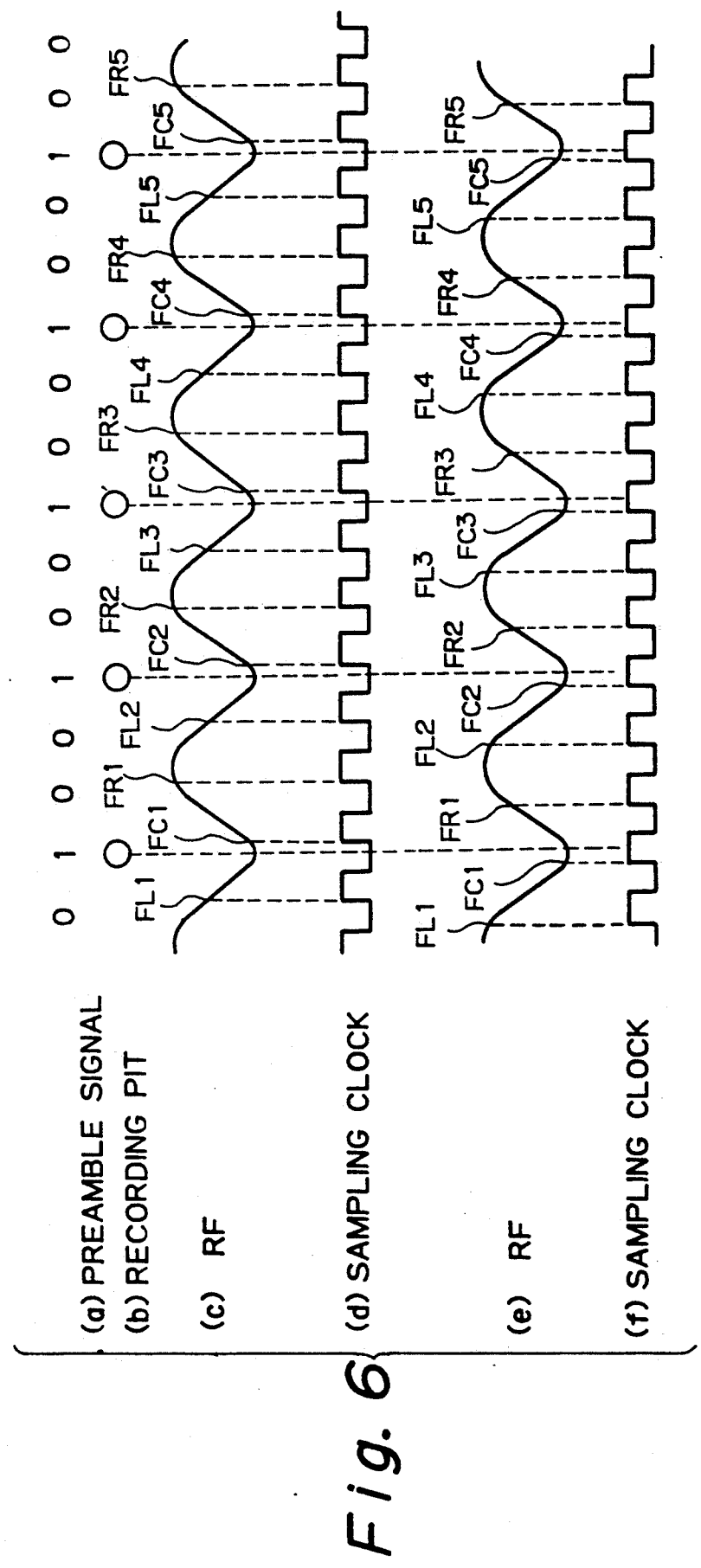
FIG. 6 is a schematic view for explaining a differential change in sampling value provided by a difference in phase between a sampling clock signal and a reproducing signal.

For example, a sampling clock signal shown by item (d) in FIG. 6 is delayed with respect to the timing of a reproducing signal RF (see item (c) in FIG. 6) of a recording pit (see item (b) in FIG. 6) recorded to the recording track TK. In such a delay state, sampling values FL1, FL2, --- obtained by sampling the reproducing signal RF by a sampling clock signal generated at a timing just before that of the recording pit are greater than sampling values FR1, FR2, --- obtained by sampling the reproducing signal RF by a sampling clock signal generated at a timing just after that of the recording pit.

A sampling clock signal shown by item (f) in FIG. 6 is advanced with respect to the timing of a reproducing signal RF (see item (e) in FIG. 6) of the recording pit recorded to the recording track TK. In such an advancing state, sampling values FL1, FL2, --- obtained by sampling the reproducing signal RF by a sampling clock signal generated at a timing just before that of the recording pit are smaller than sampling values FR1, FR2, ---obtained by sampling the reproducing signal RF by a sampling clock signal generated at a timing just after that of the recording pit.

Figure 7:
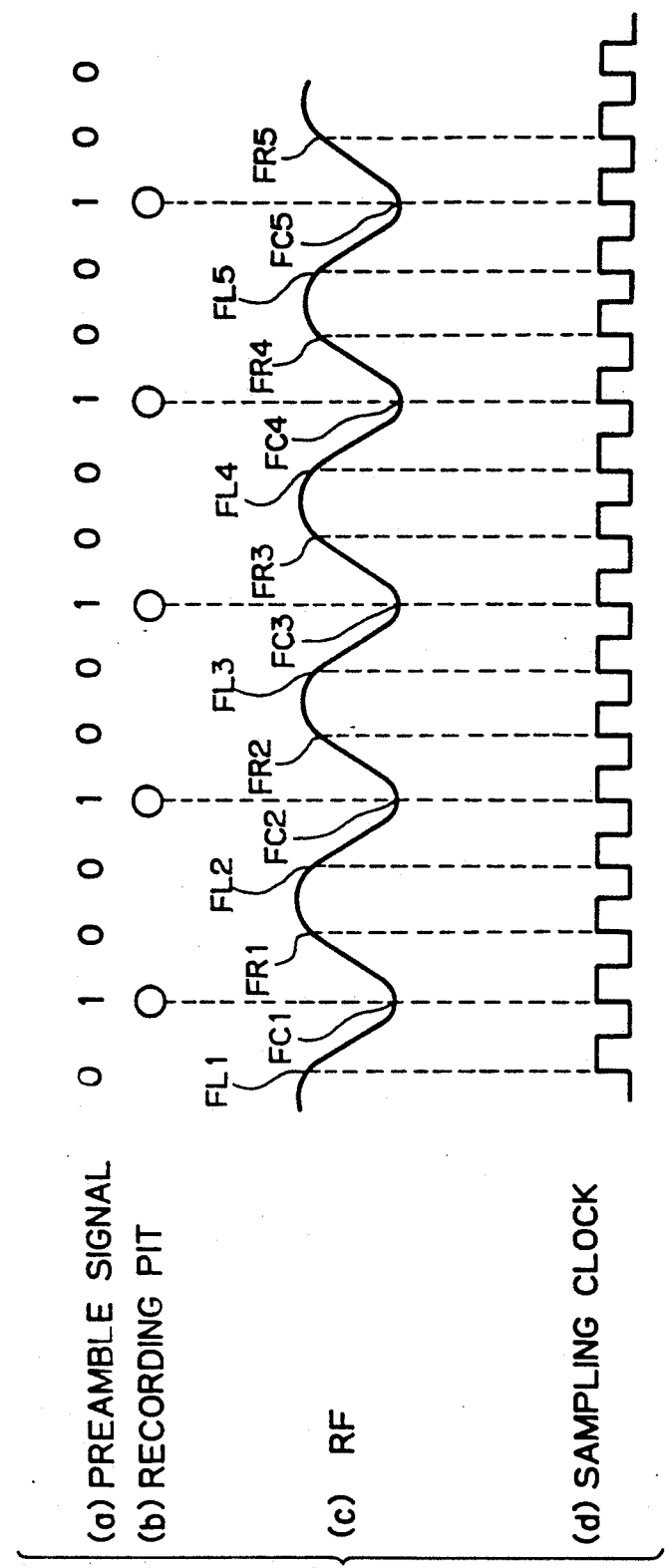
FIG. 7 is a schematic view for explaining a differential change in sampling value provided by a difference in phase between the sampling clock signal and the reproducing signal.

Further, the timing of a sampling clock signal shown by item (d) in FIG. 7 is in conformity with the timing of a reproducing signal RF (see item (c) in FIG. 7) of the recording pit recorded to the recording track TK. In such a conformity state, sampling values FL1, FL2, ---obtained by sampling the reproducing signal RF by a sampling clock signal generated at a timing just before that of the recording pit are respectively equal to sampling values FR1, FR2, --- obtained by sampling the reproducing signal RF by a sampling clock signal generated at a timing just after that of the recording pit.

Accordingly, an error in phase between the sampling clock signals at the data-recording time and the data-reproducing time can be judged by calculating differences in voltage level between the sampling values FL1, FL2, --- and FR1, FR2, --- obtained by the sampling processing using the sampling clock signals generated before and after the timing of the reproducing signal RF of the recording pit.

Figure 8:
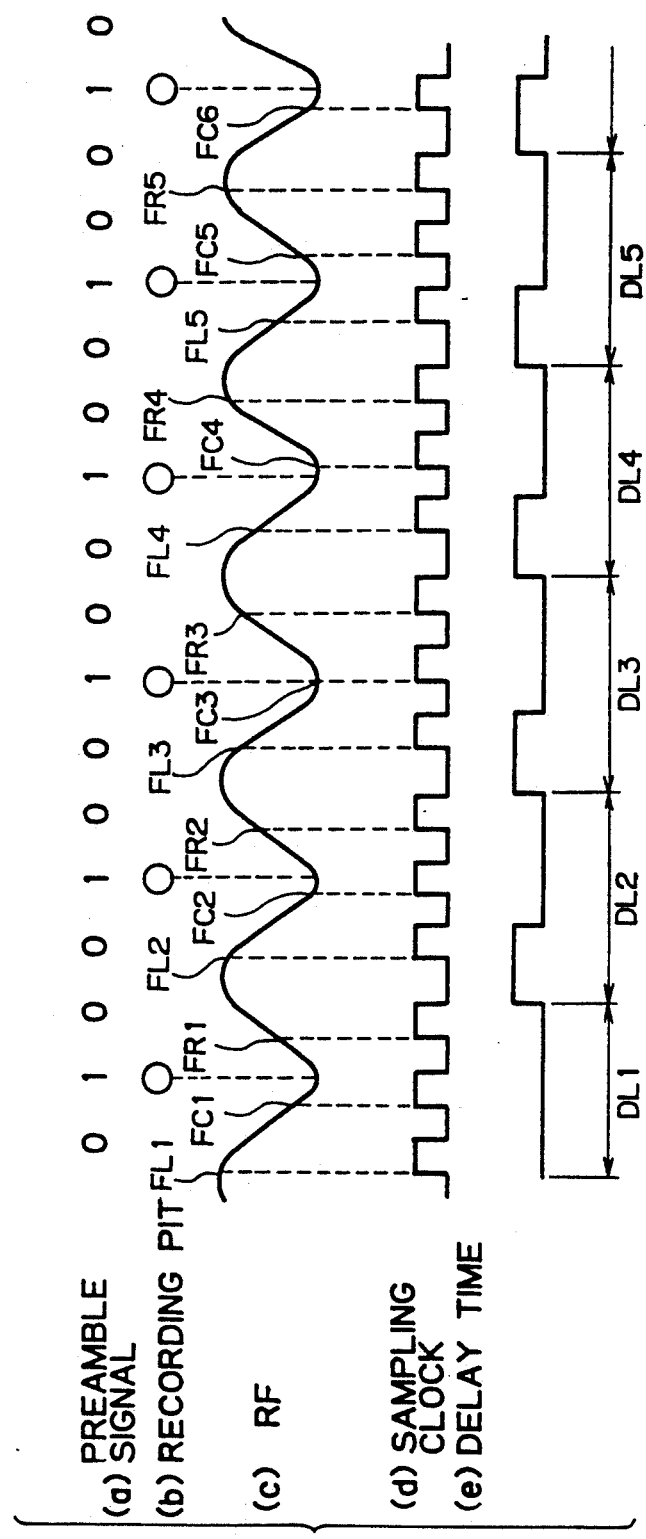
FIG. 8 is a schematic view for explaining one example of a method for calculating a delay amount in the present invention.

In this embodiment, as shown by items (a) to (e) in FIG. 8, a delay time of the sampling clock signal is sequentially changed for a period for detecting the preamble signal, and the above differences in voltage level between the sampling values FL1, FL2, --- and FR1, FR2, --- are calculated with respect to each delay time.

Figure 9:
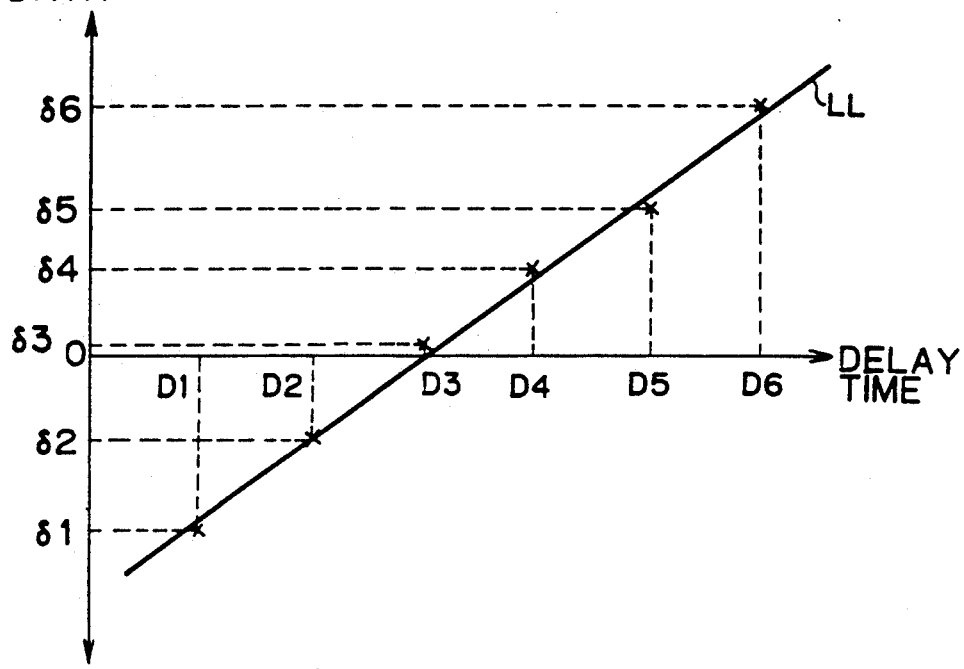
FIG. 9 is a graph showing one example of an approximate straight line.

For example, in a graph shown in FIG. 9, the delay time is shown on the axis of abscissa and differential data $\delta$ are shown on the axis of ordinate. The relation between the delay time and the differential data $\delta$ actually detected is plotted on this graph to form an approximate straight line LL passing through plotted points.

A time value on the axis of abscissa at an intersection point between the approximate straight line LL and the axis of abscissa indicates a delay time at which the differential data $\delta$ show value zero. This delay time is equal to a delay time for setting the difference in phase between the sampling clock signals at the data-reproducing time and the data-recording time to be zero.

As mentioned above, the delay time of the sampling clock signal is sequentially changed for a period for detecting the preamble signal to calculate the respective differences in voltage level between the sampling values FL1, FL2, --- and FR1, FR2, --- obtained by sampling the reproducing signal RF using the sampling clock signals generated before and after the timing of the reproducing signal RF of the recording pit. Then, a straight line approximate calculation is made on the basis of the respective delay times and the differential data. Further, a delay time for providing zero differential data is calculated on the basis of the calculated results of the straight line approximate calculation. Thus, it is possible to obtain a fine adjustment value of the phase of the sampling clock signal.

Figure 10:
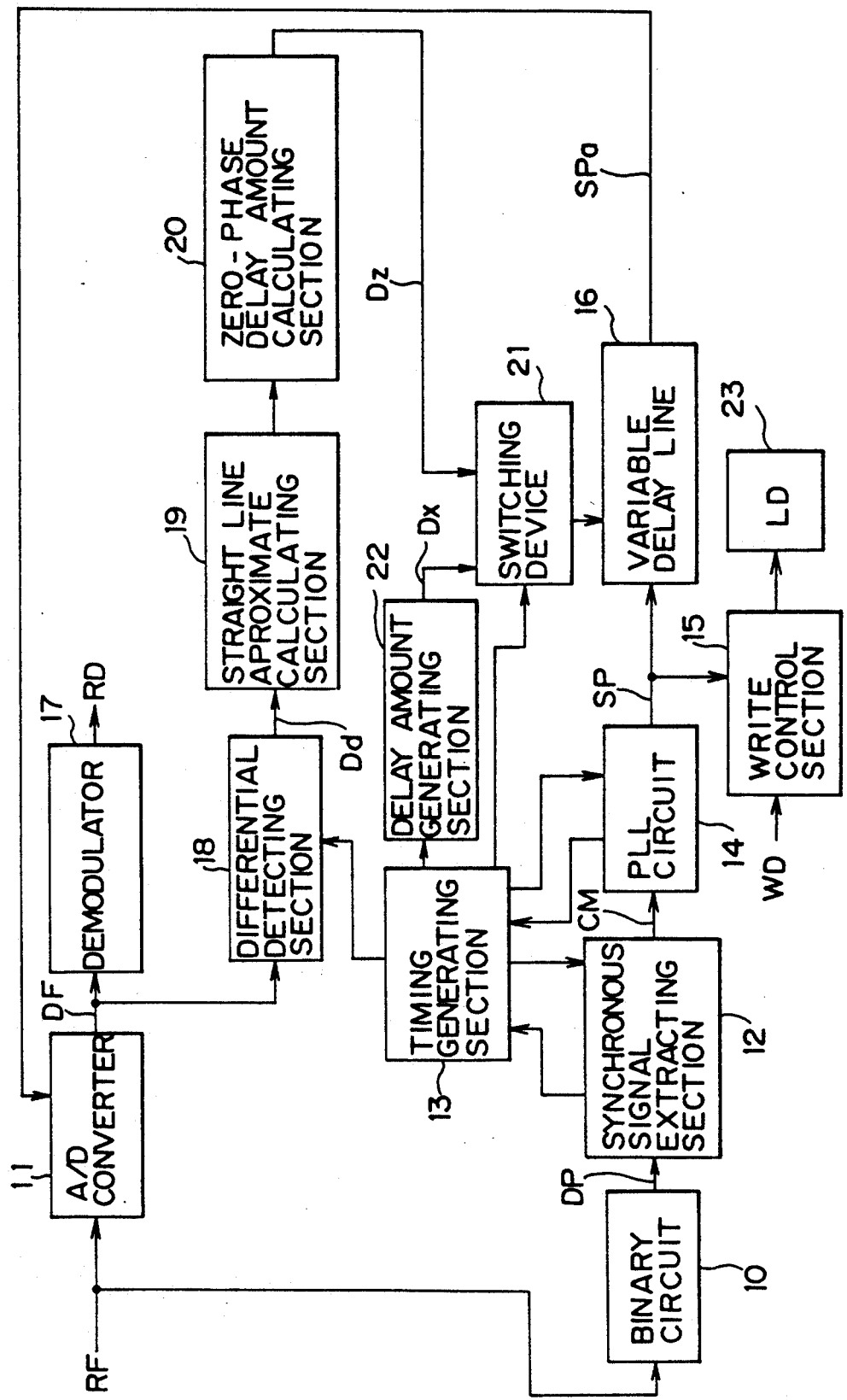
FIG. 10 is a block diagram showing one example of a phase controller in accordance with one embodiment of the present invention.

FIG. 10 shows a phase controller in one embodiment of the present invention.

In FIG. 10, a reproducing signal RF obtained by an unillustrated optical pickup device is inputted to a binary circuit 10 and an analog/digital converter 11.

The binary circuit 10 converts the reproducing signal RF to a reproducing pulse signal DP by binary processing thereof. The reproducing pulse signal DP is transmitted to a synchronous signal extracting section 12.

The synchronous signal extracting section 12 detects a synchronous signal such as electric signals indicative of a sector mark SM and a clock mark based on the reproducing pulse signal DP. A detecting mode of the synchronous signal extracting section 12 is set by a timing generating section 13. The detected results of the synchronous signal extracting section 12 are transmitted to the timing generating section 13. Further, when the clock mark is detected by the synchronous signal extracting section 12, an electric signal CM indicative of this clock mark is transmitted to a PLL (phase-locked loop) circuit 14.

The PLL circuit 14 generates a sampling clock signal SP having a predetermined frequency and synchronizes a phase of the sampling clock signal SP with that of the inputted clock mark signal CM. This sampling clock signal SP is transmitted to a write control section 15. The sampling clock signal SP is also transmitted as a sampling clock signal SPa to the analog/digital converter 11 through a variable delay line 16 in a state in which the sampling clock signal SP is delayed by a predetermined amount.

The analog/digital converter 11 samples the reproducing signal RF inputted at a timing for inputting the sampling clock signal SPa to this inverter 11. The analog/digital converter 11 then converts a sampling value of the reproducing signal RF to predetermined digital reproducing data DF. The digital reproducing data DF are transmitted to a demodulator 17 and a differential detecting section 18.

The differential detecting section 18 sequentially calculates a difference between the digital reproducing data DF obtained by sampling the reproducing signal RF using the sampling clock signals SPa generated before and after the timing of the reproducing signal RF of a recording pit. The differential detecting section 18 sequentially calculates this difference at a timing assigned by the timing generating section 13. Differential data Dd obtained by the differential detecting section 18 are transmitted to a straight line approximate calculating section 19.

The straight line approximate calculating section 19 calculates the above-mentioned approximate straight line LL based on the differential data Dd. The calculated results of the straight line approximate calculating section 19 are transmitted to a zero-phase delay amount calculating section 20.

The zero-phase delay amount calculating section 20 calculates a delay amount for setting a differential value of the differential data Dd to zero based on the calculated results of the straight line approximate calculating section 19. The calculated delay amount is transmitted to one input terminal of a switching device 21 as a zero-phase delay amount command value Dz.

A delay amount generating section 22 generates a delay amount command value Dx for assigning the delay amount of the variable delay line 16. The delay amount generating section 22 suitably changes the delay amount command value Dx by commands of the timing generating section 13. This changed delay amount command value Dx is transmitted to another input terminal of the switching device 21.

The switching device 21 selects one of the zero-phase delay mount command value Dz and the delay amount command value Dx by commands of the timing generating section 13. The selected zero-phase delay amount command value Dz or delay amount command value Dx is transmitted to an input terminal of the variable delay line 16 for the delay amount command value.

The write control section 15 operates a semiconductor laser element 23 as a light source of the optical pickup device based on the contents of recorded data WD in synchronization with the sampling clock signal SP. The demodulator 17 forms read data RD based on the digital reproducing data DF.

In the above structure, when sector data begin to be read, the timing generating section 13 sets an operating state of the synchronous signal extracting section 12 to a detecting state of the sector mark SM.

When the optical pickup device reads the sector mark SM, a data pattern of the sector mark SM is provided with respect to a reproducing pulse signal DP outputted from the binary circuit 10. Accordingly, the synchronous signal extracting section 12 detects the sector mark SM and a detecting signal indicative of the detection of the sector mark SM is outputted from the synchronous signal extracting section 12 to the timing generating section 13.

Thus, the timing generating section 13 predicts a detecting timing of the pit PC in the next servo area SBA from a detecting timing of the sector mark SM. The timing generating section 13 outputs a detecting window to the synchronous signal extracting section 12 at this predicted timing so as to detect a clock mark (pit PC). When no synchronous signal extracting section 12 can detect the clock mark, the sector mark SM is again detected to similarly detect the clock mark by the synchronous signal extracting section 12.

When the synchronous signal extracting section 12 can detect the clock mark, a clock mark signal CM is outputted from the synchronous signal extracting section 12.

Thereafter, when the synchronous signal extracting section 12 detects the clock mark, the clock mark signal CM is outputted from the synchronous signal extracting section 12 to the PLL circuit 14 at this detecting timing. This outputting operation is repeatedly performed so that a phase-synchronizing input operation of the clock mark signal CM with respect to the sampling clock signal SP is completely performed.

Figure 11:
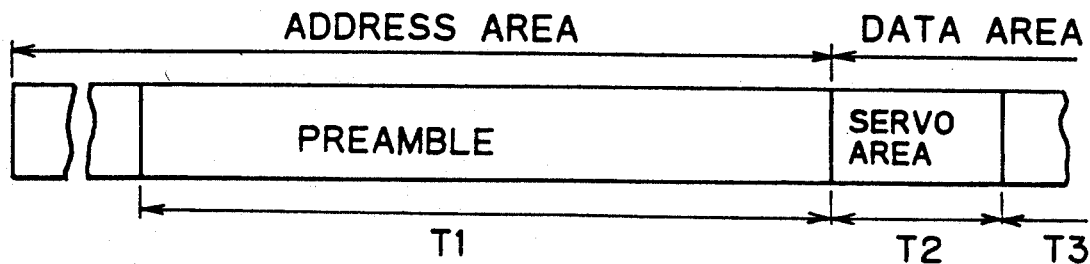
FIG. 11 is a schematic view showing one example of an operating period of the phase controller shown in FIG. 10.

Thus, as shown in FIG. 11, the switching device 21 selects the delay amount command value Dx by an operation of the timing generating section 13 for a reading period T1 from a starting timing of the detection of a preamble signal to reading of the preamble signal in a state in which a phase of the sampling clock signal SP is synchronized with that of the clock mark signal. Further, the switching device 21 sequentially changes the delay amount command value Dx generated from the delay amount generating section 22 for this reading period T1 by the operation of the timing generating section 13 at the timing of a recording pit of the preamble signal. Further, the timing generating section 13 starts an operation of the differential detecting section 18.

Thus, the delay amount of the sampling clock signal SP is sequentially changed. The differential detecting section 18 calculates a difference between digital reproducing data DF obtained by sampling the reproducing signal RF using sampling clock signals SPa generated before and after the timing of the reproducing signal RF of the recording pit. The differential detecting section 18 calculates this difference with respect to each of delay times. The differential data Dd are sequentially outputted from the differential detecting section 18 to the straight line approximate calculating section 19.

Thus, as mentioned above, the differential data Dd obtained for the reading period T1 of the preamble signal are used to calculate an approximate straight line LL in the straight line approximate calculating section 19. The zero-phase delay amount calculating section 20 calculates a zero-phase delay amount by using the calculated results of the approximate straight line LL. The calculating operations of the straight line approximate calculating section 19 and the zero-phase delay amount calculating section 20 are completely performed for at least a time period T2 required to read the next servo area SBA.

When this time period T2 has passed, the switching device 21 selects a zero-phase delay amount command value Dz outputted from the zero-phase delay amount calculating section 20 by the operation of the timing generating section 13. This selected zero-phase delay amount command value Dz is held for a time period T3 from the next data area DTA to the completion of this sector.

Thus, the zero-phase delay amount command value Dz corresponding to the zero-phase delay amount calculated by the zero-phase delay amount calculating section 20 is inputted to the variable delay line 16. Accordingly, the sampling clock signal SPa outputted from the variable delay line 16 is equal to a clock signal provided by delaying the sampling clock signal SP by the zero-phase delay amount.

Accordingly, the reproducing signal RF at a reading time of the user data area UDT is sampled by the sampling clock signal SPa having the same timing as the sampling clock signal at the data-recording time. This sampled reproducing signal RF is transmitted to the demodulator 17 as digital reproducing data DF. Accordingly, the demodulator 17 can suitably demodulate the digital reproducing data DF so that reproducing digital data RD are suitably formed.

Thus, in this embodiment, the phase of the sampling clock signal SP synchronized with that of the clock mark signal is finely adjusted by the variable delay line 16 to form the sampling clock signal SPa having a phase completely synchronized with that of the sampling clock signal at the data-recording time. The reproducing digital data RD can be suitably obtained since a sampling operation of the analog/digital converter 11 is performed by this sampling clock signal SPa.

The plurality of digital reproducing data DF are obtained by sampling the reproducing signal RF using sampling clock signals SPa generated before and after the timing of the reproducing signal RF of a recording pit with respect to the preamble signal. A control amount for the fine adjustment with respect to phase of the sampling clock signal is calculated on the basis of a difference between these plural digital reproducing data DF. Accordingly, the control amount can be suitably calculated in a state in which the recording pit of the preamble signal is missing by a defect in the magnetooptic disk 1, etc.

In the above embodiment, the delay time of the sampling clock signal is sequentially changed every one sampling clock signal for a period for detecting the preamble signal. However, the delay time of the sampling clock signal may be changed every a predetermined number of sampling clock signals. In this case, it is possible to use an average value of differential data obtained when the sampling clock signal having the same delay time is generated.

Figure 12:
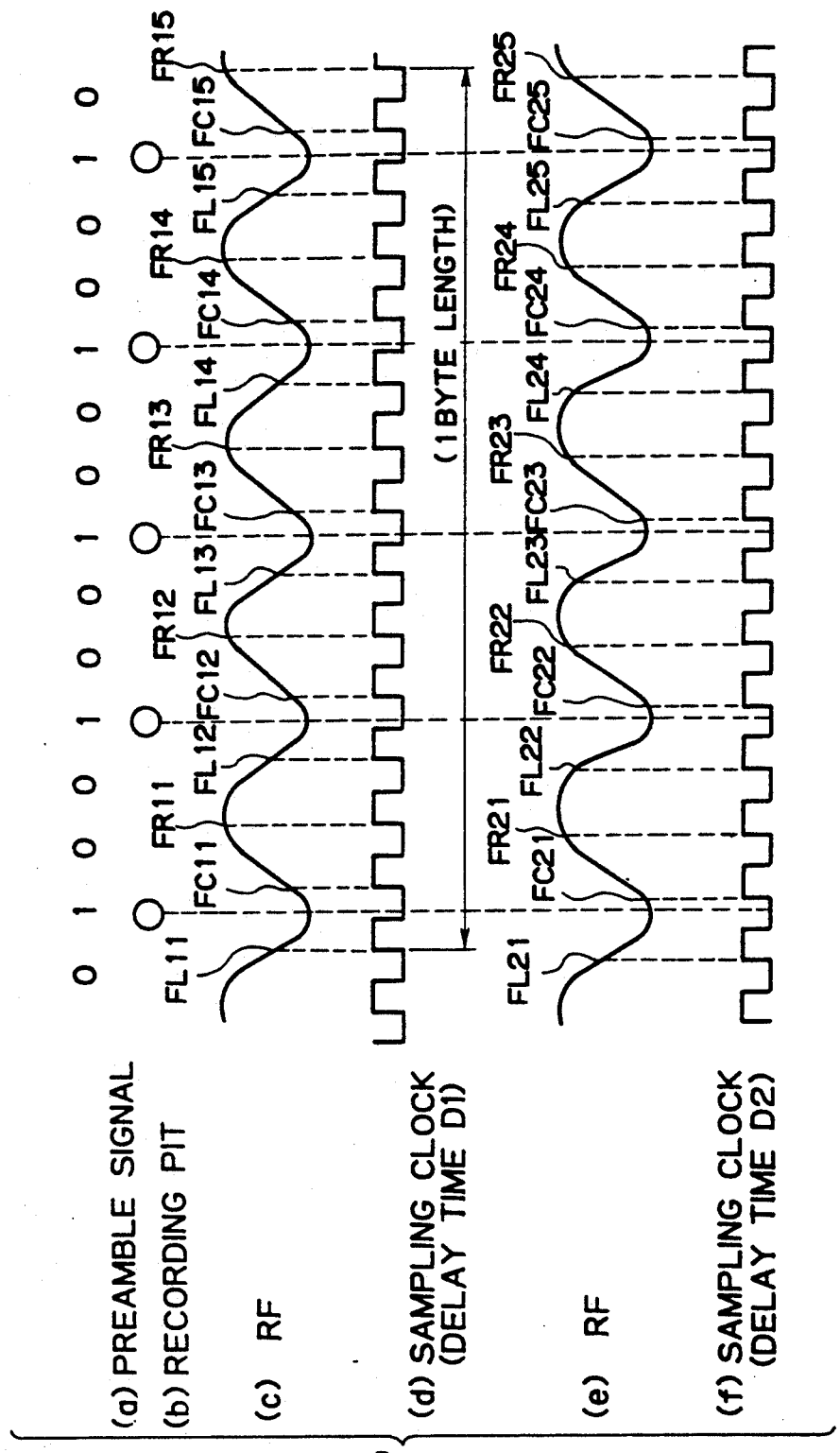
FIG. 12 is a schematic view for explaining a differential change in sampling value provided by a difference in phase between a sampling clock signal and a reproducing signal.
Figure 13:
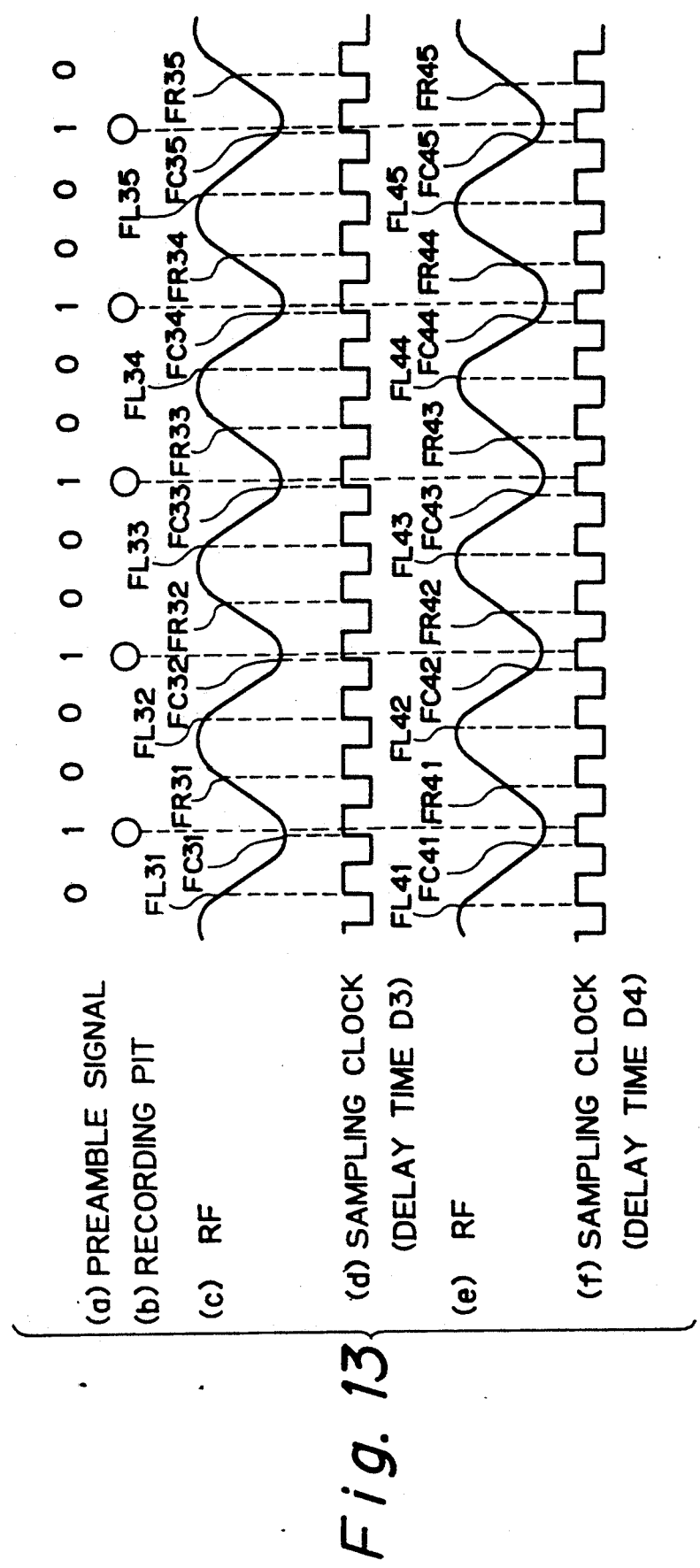
FIG. 13 is a schematic view for explaining a differential change in sampling value provided by a difference in phase between the sampling clock signal and the reproducing signal.

Namely, as shown in FIGS. 12 and 13, the delay time of a sampling clock signal is set to D1 for a period corresponding to a first one byte with respect to the period for detecting the preamble signal. Similar to the above embodiment, differences in voltage level between sampling values FL11, FL12, --- and FR11, FR12, --- are then calculated and an average value of these differences is further calculated. The delay time of a sampling clock signal is set to D2 (>D1) for a period corresponding to the next one byte. Differences in voltage level between sampling values FL21, FL22, --- and FR21, FR22, --- are then calculated and an average value of these differences is further calculated. Further, the delay time of a sampling clock signal is set to D3 (>D2) for a period corresponding to the next one byte. Differences in voltage level between sampling values FL31, FL32, --- and FR31, FR32, --- are then calculated and an average value of these differences is further calculated. Thereafter, the delay time of a sampling clock signal is sequentially changed every period corresponding to one byte of the preamble signal. Differences in voltage level between the above sampling values FL1, FL2, --- and FR1, FR2, ---are then calculated with respect to each of the delay times and an average value of these differences is further calculated.

Similar to the above case, the delay time of the sampling clock signal having a zero phase is calculated by using these average values. Thus, it is possible to obtain a fine adjustment value of the phase of the sampling clock signal.

Figure 14:
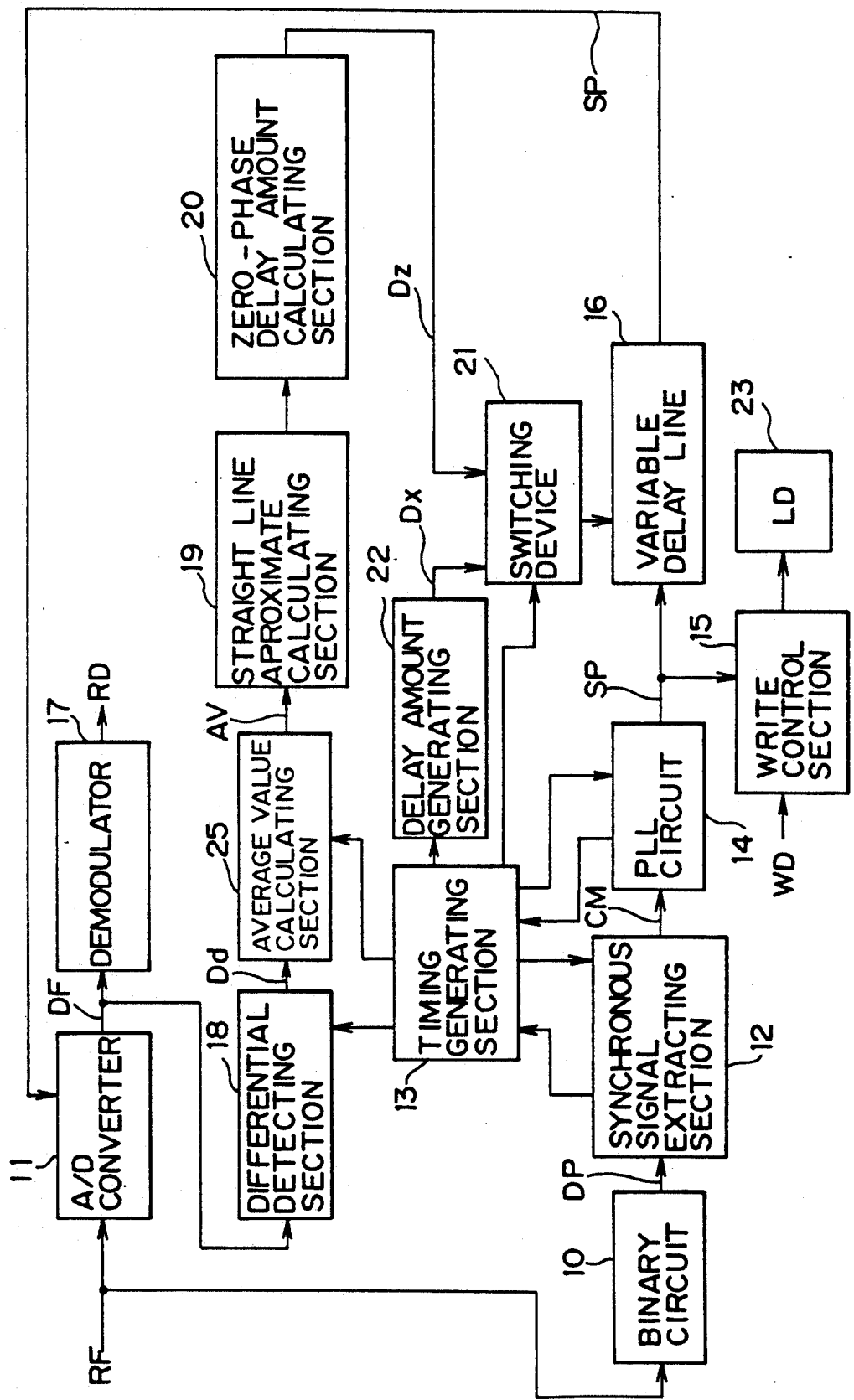
FIG. 14 is a block diagram showing one example of a phase controller in accordance with another embodiment of the present invention.

FIG. 14 shows a phase controller in another embodiment of the present invention. In FIG. 14, constructional portions equal to or corresponding to those shown in FIG. 10 are designated by the same reference numerals.

In FIG. 14, an average value calculating section 25 calculates an average value of a plurality of differential data Dd calculated by a differential detecting section 18 for a period corresponding to one byte of a preamble signal. The calculated results of the average value calculating section 25 are transmitted to a straight line approximate calculating section 19 as differential average value data AV.

The straight line approximate calculating section 19 calculates the above-mentioned approximate straight line LL based on the differential average value data AV. The calculated results of the straight line approximate calculating section 19 are transmitted to a zero-phase delay amount calculating section 20.

In the above structure, when sector data begin to be read, a timing generating section 13 sets an operating state of a synchronous signal extracting section 12 to a detecting state of a sector mark SM.

When an optical pickup device reads the sector mark SM, a data pattern of the sector mark SM is provided with respect to a reproducing pulse signal DP outputted from a binary circuit 10. Accordingly, the synchronous signal extracting section 12 detects the sector mark SM and a detecting signal indicative of the detection of the sector mark SM is outputted from the synchronous signal extracting section 12 to the timing generating section 13.

Thus, the timing generating section 13 predicts a detecting timing of the pit PC in the next servo area SBA from a detecting timing of the sector mark SM. The timing generating section 13 outputs a detecting window to the synchronous signal extracting section 12 at this predicted timing so as to detect a clock mark (pit PC). When no synchronous signal extracting section 12 can detect the clock mark, the sector mark SM is again detected to similarly detect the clock mark by the synchronous signal extracting section 12.

When the synchronous signal extracting section 12 can detect the clock mark, a clock mark signal CM is outputted from the synchronous signal extracting section 12.

Thereafter, when the synchronous signal extracting section 12 detects the clock mark, the clock mark signal CM is outputted to a PLL circuit 14 at this detecting timing. This outputting operation is repeatedly performed so that a phase-synchronizing input operation of the clock mark signal CM with respect to the sampling clock signal SP is completely performed.

Thus, as shown in FIG. 11, a switching device 21 selects a delay amount command value Dx by an operation of the timing generating section 13 for a reading period T1 from a starting timing of the detection of a preamble signal to reading of the preamble signal in a state in which a phase of the sampling clock signal SP is synchronized with that of the clock mark signal. Further, the switching device 21 sequentially changes the delay amount command value Dx generated from the delay amount generating section 22 for this reading period T1 by the operation of the timing generating section 13 at a timing at which a period corresponding to one byte of the preamble signal has passed.

Further, the timing generating section 13 starts an operation of the differential detecting section 18. The timing generating section 13 also starts a periodic calculation of the average value calculating section 25 at a timing for changing the delay amount command value Dx.

Thus, a delay amount of the sampling clock signal SP is sequentially changed every period corresponding to one byte of the preamble signal. The differential detecting section 18 calculates a difference between digital reproducing data DF obtained by sampling a reproducing signal RF using sampling clock signals SPa generated before and after the timing of the reproducing signal RF of a recording pit. The differential detecting section 18 calculates this difference with respect to each of delay times. The average value calculating section 25 calculates an average value of differential data Dd at each of the delay times. Differential average value data AV are sequentially outputted from the average value calculating section 25 to the straight line approximate calculating section 19.

Thus, as mentioned above, the differential average value data AV obtained for the reading period T1 of the preamble signal are used to calculate an approximate straight line LL in the straight line approximate calculating section 19. The zero-phase delay amount calculating section 20 calculates a zero-phase delay amount by using the calculated results of the approximate straight line LL. The calculating operations of the straight line approximate calculating section 19 and the zero-phase delay amount calculating section 20 are completely performed for at least a time period T2 required to read the next servo area SBA.

When this time period T2 passed, the switching device 21 selects a zero-phase delay amount command value Dz outputted from the zero-phase delay amount calculating section 20 by the operation of the timing generating section 13. This selected zero-phase delay amount command value Dz is held for a time period T3 from the next data area DTA to the completion of this sector.

Thus, similar to the above-mentioned embodiments, the zero-phase delay amount command value Dz corresponding to the zero-phase delay amount calculated by the zero-phase delay amount calculating section 20 is inputted to a variable delay line 16. Accordingly, a sampling clock signal SPa outputted from the variable delay line 16 is equal to a clock signal provided by delaying the sampling clock signal SP by the zero-phase delay amount. As a result, a demodulator 17 can suitably demodulate the digital reproducing data DF so that reproducing digital data RD are suitably formed.

Thus, in this embodiment, differential data at the same delay time are formed by the number of sampling clock signals obtained for a period corresponding to one byte of the preamble signal. An average value of these differential data is used as differential data obtained at the delay time of the sampling clock signal provided at that time. Accordingly, the differential data can be obtained even in a state in which no recording pit of the preamble signal is missing by a defect in a recording medium, etc., thereby improving the reliability of a control amount.

Figure 15:
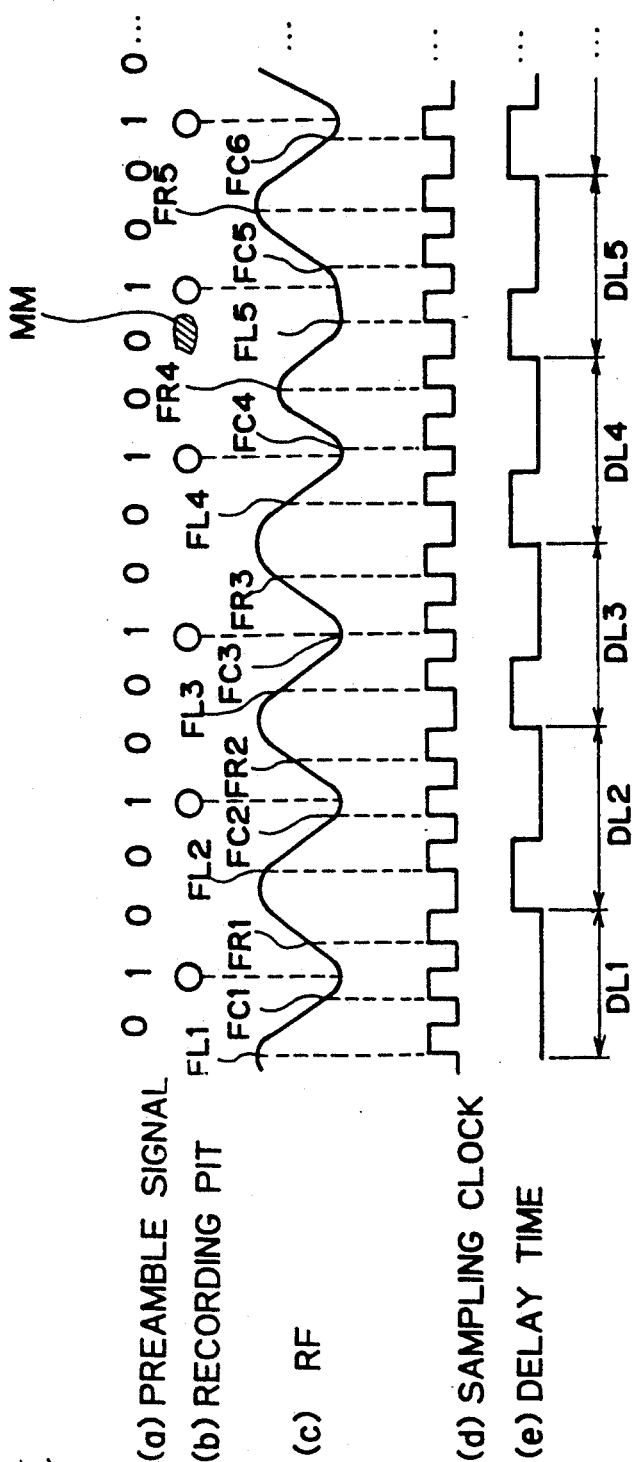
FIG. 15 is a schematic view for explaining problems caused when a defect in a recording medium is caused.

For example, as shown by items (a) to (e) in FIG. 15, there is a case in which a medium defect MM is caused in a recording region of the preamble signal so that there is an error in sampling value FL5 of a reproducing signal RF of a fifth recording pit of the preamble signal. In this case, as shown in FIG. 16, differential data $\delta 5'$ between sampling values FL5 and FR5 of this fifth recording pit provide a very large value in comparison with the other differential data.

Figure 16:
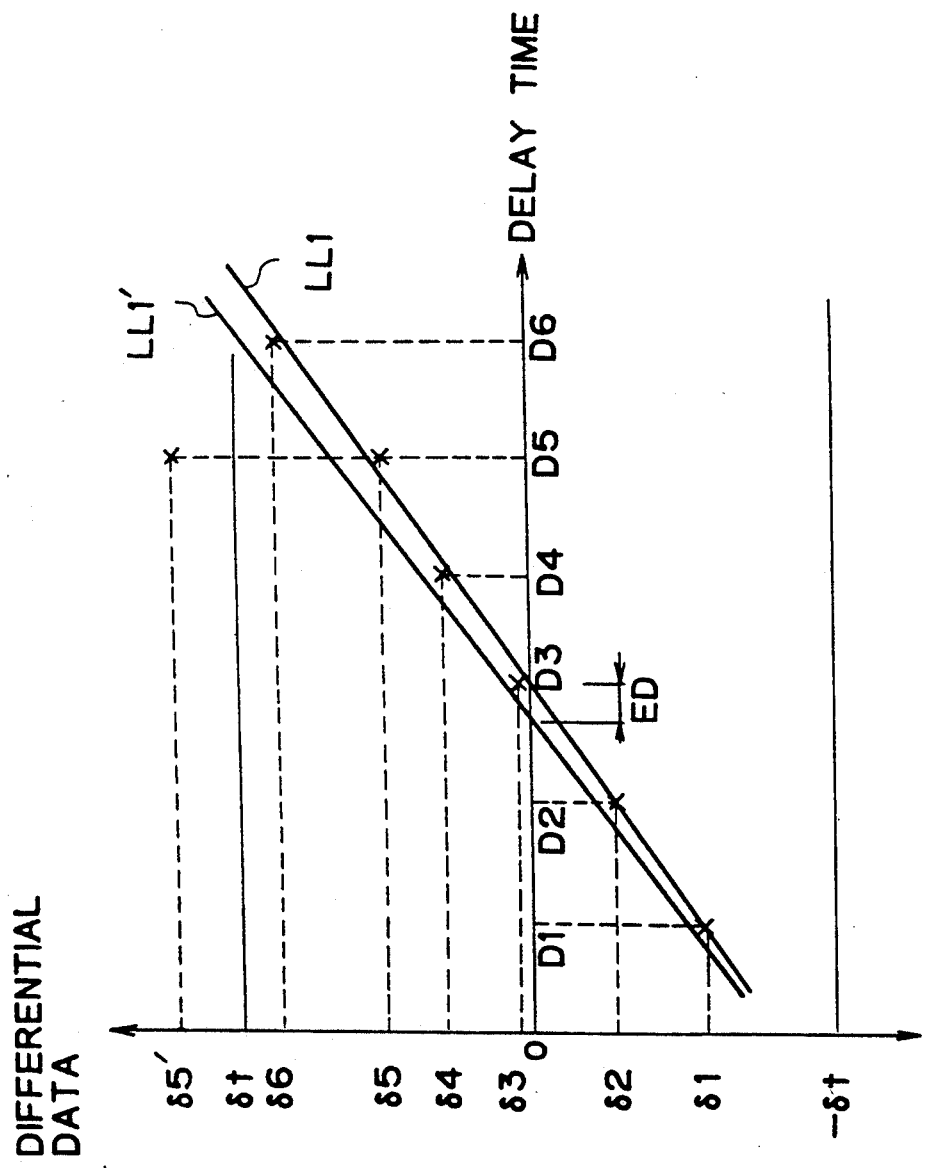
FIG. 16 is a graph showing another example of the approximate straight line.

Accordingly, in this case, the approximate straight line formed by the above phase controller shown in FIG. 10 is provided as a straight line LL1' shown in FIG. 16. A zero-phase delay amount calculated by using this approximate straight line LL1' includes an error ED in comparison with a zero-phase delay amount calculated on the basis of an approximate straight line LL1 formed by using differential data $\delta 5$ obtained when there is no medium defect MM.

Accordingly, when there is the medium defect MM in the recording region of the preamble signal and there is an error in sampling value of the reproducing signal RF of the recording pit of the preamble signal, there is a case in which an error in the obtained zero-phase delay amount is caused in the above-mentioned embodiment.

To prevent such a situation, for example, a suitable range of the differential data of the sampling value is prescribed as $\pm\delta t$ and no differential data exceeding this suitable range are used when the approximate straight line is calculated.

Figure 17:
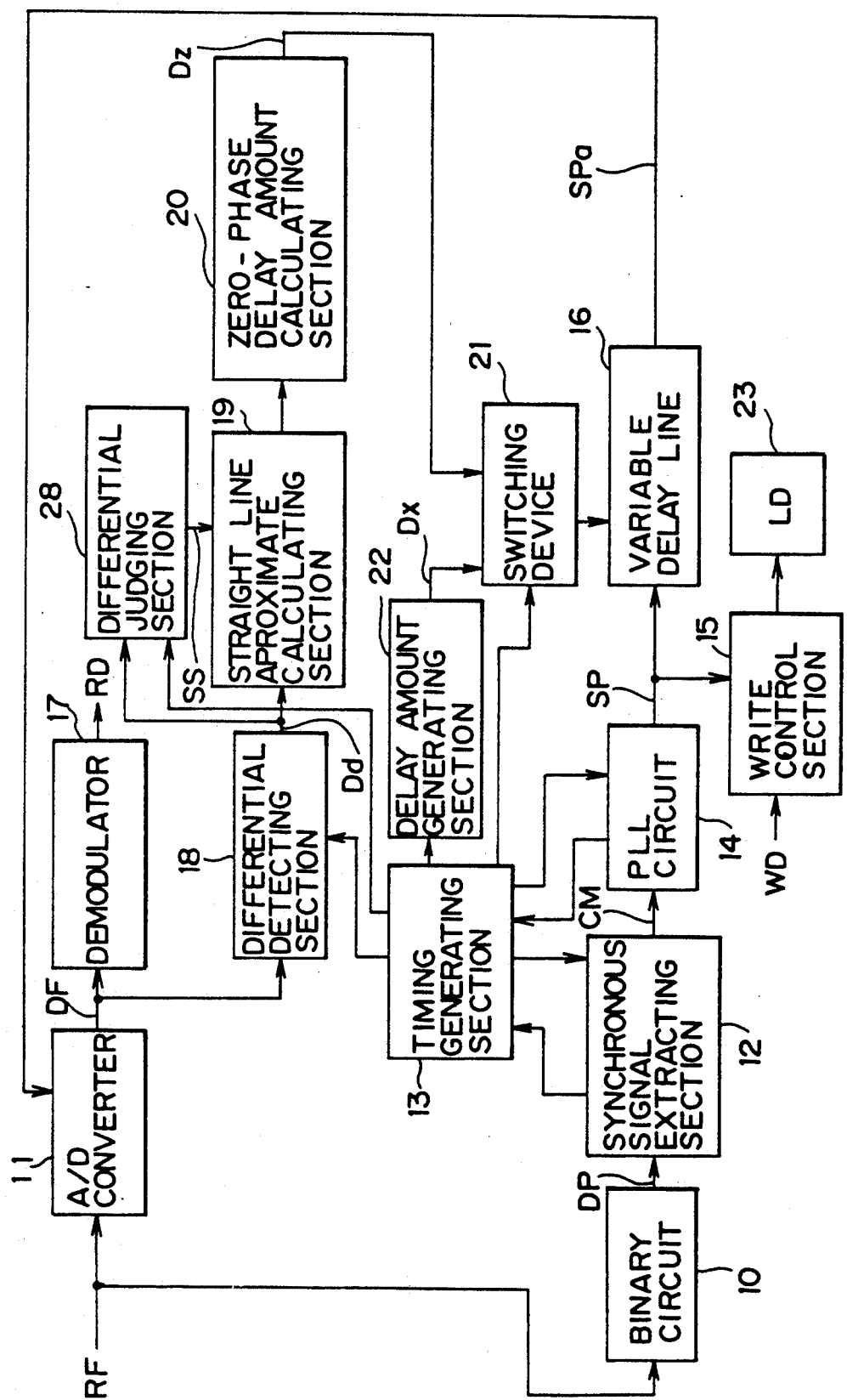
FIG. 17 is a block diagram showing one example of a phase controller in accordance with another embodiment of the present invention.

FIG. 17 shows a phase controller in accordance with another embodiment of the present invention. In FIG. 17, constructional portions equal to or corresponding to those shown in FIG. 10 are designated by the same reference numerals.

In FIG. 10, a differential detecting section 18 sequentially calculates a difference between digital reproducing data DF obtained by sampling a reproducing signal RF using sampling clock signals SPa generated before and after the timing of the reproducing signal RF of a recording pit. The differential detecting section 18 sequentially calculates this difference at a timing assigned by a timing generating section 13. Differential data Dd obtained by the differential detecting section 18 are transmitted to a straight line approximate calculating section 19 and a differential judging section 28.

The differential judging section 28 judges whether or not the differential data Dd are provided in a predetermined suitable range. When the differential judging section 28 judges that the differential data Dd are provided in the predetermined suitable range, the differential judging section 28 outputs a judging signal SS to the straight line approximate calculating section 19.

The straight line approximate calculating section 19 calculates the above-mentioned approximate straight line LL based on the differential data Dd inputted to this calculating section 19 when the judging signal SS is outputted from the differential judging section 28. The calculated results of the straight line approximate calculating section 19 are transmitted to a zero-phase delay amount calculating section 20.

In the above structure, similar to the above embodiments, when sector data begin to be read, a synchronous signal extracting section 12 detects a sector mark SM by an operation of the timing generating section 13. The synchronous signal extracting section 12 also detects a clock mark (pit PC) by the operation of the timing generating section 13. The synchronous signal extracting section 12 further performs a phase-synchronizing output operation of a clock mark signal CM with respect to a sampling clock signal SP by the operation of the timing generating section 13.

Thus, a switching device 21 selects a delay amount command value Dx by an operation of the timing generating section 13 for a reading period T1 from a starting timing of the detection of a preamble signal to reading of the preamble signal in a state in which a phase of the sampling clock signal SP is synchronized with that of the clock mark signal. Further, the switching device 21 sequentially changes the delay amount command value Dx generated from a delay amount generating section 22 for this reading period T1 by the operation of the timing generating section 13 at the timing of a recording pit of the preamble signal. Further, the timing generating section 13 starts operations of the differential detecting section 18 and the differential judging section 28.

Thus, a delay amount of the sampling clock signal SP is sequentially changed. The differential detecting section 18 calculates a difference between digital reproducing data DF obtained by sampling a reproducing signal RF using sampling clock signals SPa generated before and after the timing of the reproducing signal RF of the recording pit. The differential detecting section 18 calculates this difference with respect to each of delay times.

The differential data Dd judged by the differential judging section 28 as a data value within the suitable range are outputted to the straight line approximate calculating section 19.

Thus, as mentioned above, the differential data Dd obtained for the reading period T1 of the preamble signal within the suitable range are used to calculate the approximate straight line LL in the straight line approximate calculating section 19. The zero-phase delay amount calculating section 20 calculates a zero-phase delay amount by using the calculated results of the approximate straight line LL. The calculating operations of the straight line approximate calculating section 19 and the zero-phase delay amount calculating section 20 are completely performed for at least a time period T2 required to read the next servo area SBA.

When this time period T2 has passed, the switching device 21 selects a zero-phase delay amount command value Dz outputted from the zero-phase delay amount calculating section 20 by the operation of the timing generating section 13. This selected zero-phase delay amount command value Dz is held for a time period T3 from the next data area DTA to the completion of this sector.

Thus, the zero-phase delay amount command value Dz corresponding to a zero-phase delay amount calculated by the zero-phase delay amount calculating section 20 is inputted to a variable delay line 16. Accordingly, a sampling clock signal SPa outputted from the variable delay line 16 is equal to a clock signal provided by delaying the sampling clock signal SP by the zero-phase delay amount.

Accordingly, the reproducing signal RF at a reading time of a user data area UDT is sampled by the sampling clock signal SPa having the same timing as the sampling clock signal at a data-recording time. This sampled reproducing signal RF is transmitted to a demodulator 17 as digital reproducing data DF. Accordingly, the demodulator 17 can suitably demodulate the digital reproducing data DF so that reproducing digital data RD are suitably formed.

Thus, in this embodiment, the phase of the sampling clock signal SP synchronized with that of the clock mark signal is finely adjusted by the variable delay line 16 to form the sampling clock signal SPa having a phase completely synchronized with that of the sampling clock signal at the data-recording time. The reproducing digital data RD can be suitably obtained since the sampling operation of an analog/digital converter 11 is performed by this sampling clock signal SPa.

The differential data Dd used for calculation of the straight line approximate calculating section 19 are limited by the differential judging section 28 within a predetermined suitable range. Accordingly, when there is a defect in a recording region of the preamble signal and a sampling value of the reproducing data DF includes an error caused by a noise, the zero-phase delay amount can be accurately calculated without any influence of this noise.

Figure 18:
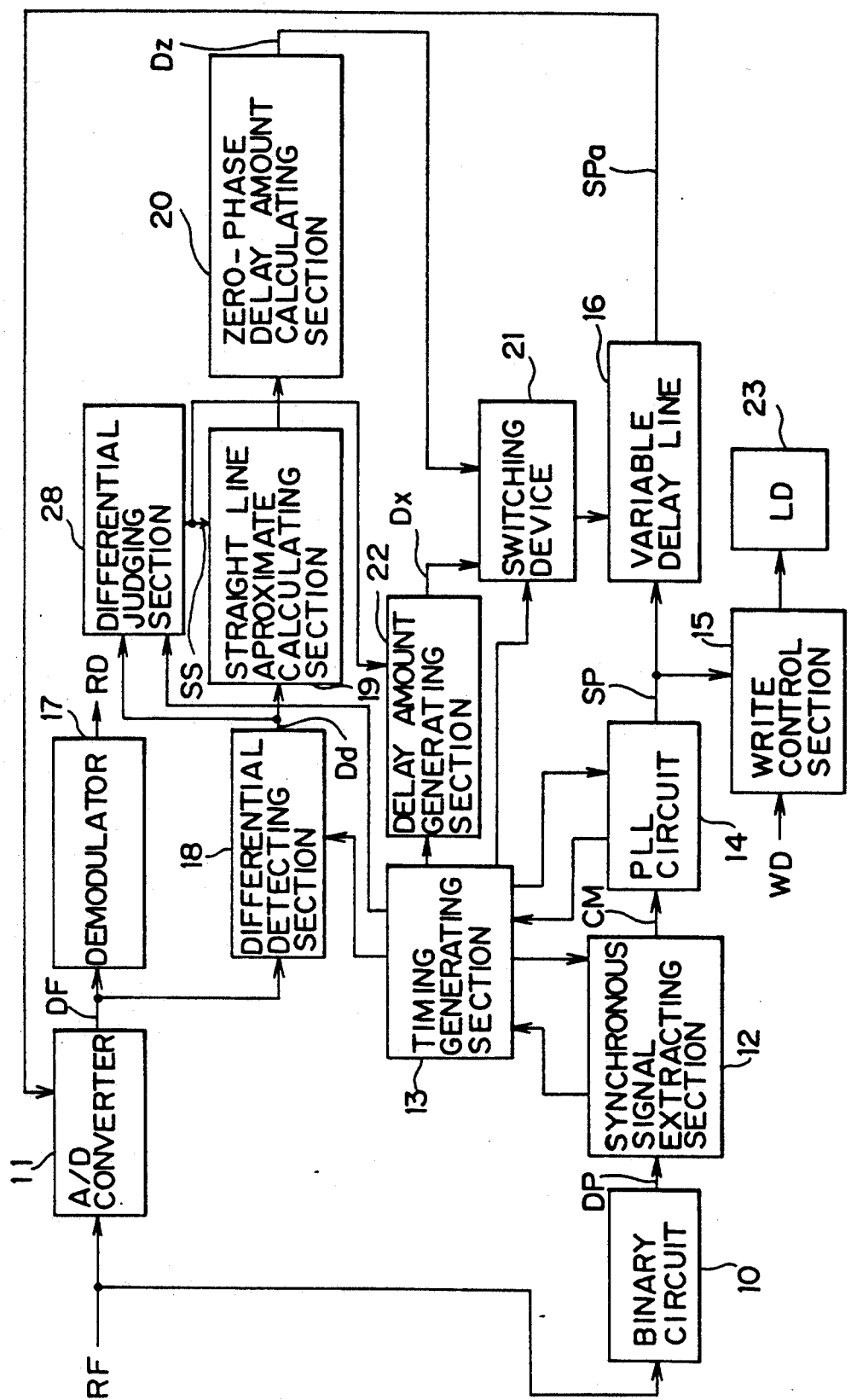
FIG. 18 is a block diagram showing one example of a phase controller in accordance with another embodiment of the present invention.

FIG. 18 shows a phase controller in accordance with another embodiment of the present invention. In FIG. 18, constructional portions equal to or corresponding to those shown in FIG. 17 are designated by the same reference numerals.

In FIG. 18, a judging signal SS is outputted from a differential judging section 28 to a straight line approximate calculating section 19 and a delay amount generating section 22.

The delay amount generating section 22 generates a delay amount command value Dx for assigning a delay amount of a variable delay line 16. When a mode for changing the delay amount command value Dx is set by commands of a timing generating section 13, the delay amount generating section 22 changes the delay amount command value Dx to the next value under a condition in which the judging signal SS is inputted to the delay amount generating section 22. This delay amount command value Dx is transmitted to one input terminal of a switching device 21.

In the above structure, similar to the above-mentioned embodiments, when sector data begin to be read, a synchronous signal extracting section 12 detects a sector mark SM by an operation of the timing generating section 13. The synchronous signal extracting section 12 also detects a clock mark (pit PC) by the operation of the timing generating section 13. The synchronous signal extracting section 12 further performs a phase-synchronizing output operation of a clock mark signal CM with respect to a sampling clock signal SP by the operation of the timing generating section 13.

Thus, the switching device 21 selects a delay amount command value Dx by an operation of the timing generating section 13 for a reading period T1 from a starting timing of the detection of a preamble signal to reading of the preamble signal in a state in which a phase of the sampling clock signal SP is synchronized with that of the clock mark signal. Further, the timing generating section 13 gives commands for switching the delay amount command value Dx to the delay amount generating section 22 for this reading period T1 at the timing of a recording pit of the preamble signal. Further, the timing generating section 13 starts operations of a differential detecting section 18 and the differential judging section 28.

Thus, a delay amount of the sampling clock signal SP is set by the delay amount generating section 22. The differential detecting section 18 calculates a difference between digital reproducing data DF obtained by sampling a reproducing signal RF using sampling clock signals SPa generated before and after the timing of the reproducing signal RF of the recording pit. The differential detecting section 18 calculates this difference with respect to each of delay times.

Differential data Dd judged by the differential judging section 28 as a data value within a suitable range are outputted to the straight line approximate calculating section 19. Further, a delay amount of the sampling clock signal SP set by the delay amount generating section 22 is sequentially changed at the next timing at which the differential data Dd within the suitable range are obtained.

Thus, the differential data Dd obtained for a reading period T1 of the preamble signal within the suitable range are used to calculate an approximate straight line LL in the straight line approximate calculating section 19. A zero-phase delay amount calculating section 20 calculates a zero-phase delay amount by using the calculated results of the approximate straight line LL. The calculating operations of the straight line approximate calculating section 19 and the zero-phase delay amount calculating section 20 are completely performed for at least a time period T2 required to read the next servo area SBA.

When this time period T2 has passed, the switching device 21 selects a zero-phase delay amount command value Dz outputted from the zero-phase delay amount calculating section 20 by the operation of the timing generating section 13. This selected zero-phase delay amount command value Dz is held for a time period T3 from the next data area DTA to the completion of this sector.

Thus, the zero-phase delay amount command value Dz corresponding to the zero-phase delay amount calculated by the zero-phase delay amount calculating section 20 is inputted to a variable delay line 16. Accordingly, a sampling clock signal SPa outputted from the variable delay line 16 is equal to a clock signal provided by delaying the sampling clock signal SP by the zero-phase delay amount.

Accordingly, the reproducing signal RF at a reading time of a user data area UDT is sampled by the sampling clock signal SPa having the same timing as the sampling clock signal at a data-recording time. This sampled reproducing signal RF is transmitted to a demodulator 17 as digital reproducing data DF. Accordingly, the demodulator 17 can suitably demodulate the digital reproducing data DF so that reproducing digital data RD are suitably formed.

Thus, in this embodiment, when the differential data Dd judged by the differential judging section 28 as data within the suitable range are obtained, the delay amount of the sampling clock signal SP is continuously changed. In the other cases, no delay amount of the sampling clock signal SP is changed. Accordingly, it is possible to obtain all sampling data required to make a calculation of the straight line approximate calculating section 19. Therefore, an approximate straight line can be accurately calculated so that an accuracy in zero-phase delay amount is improved.

Figure 19:
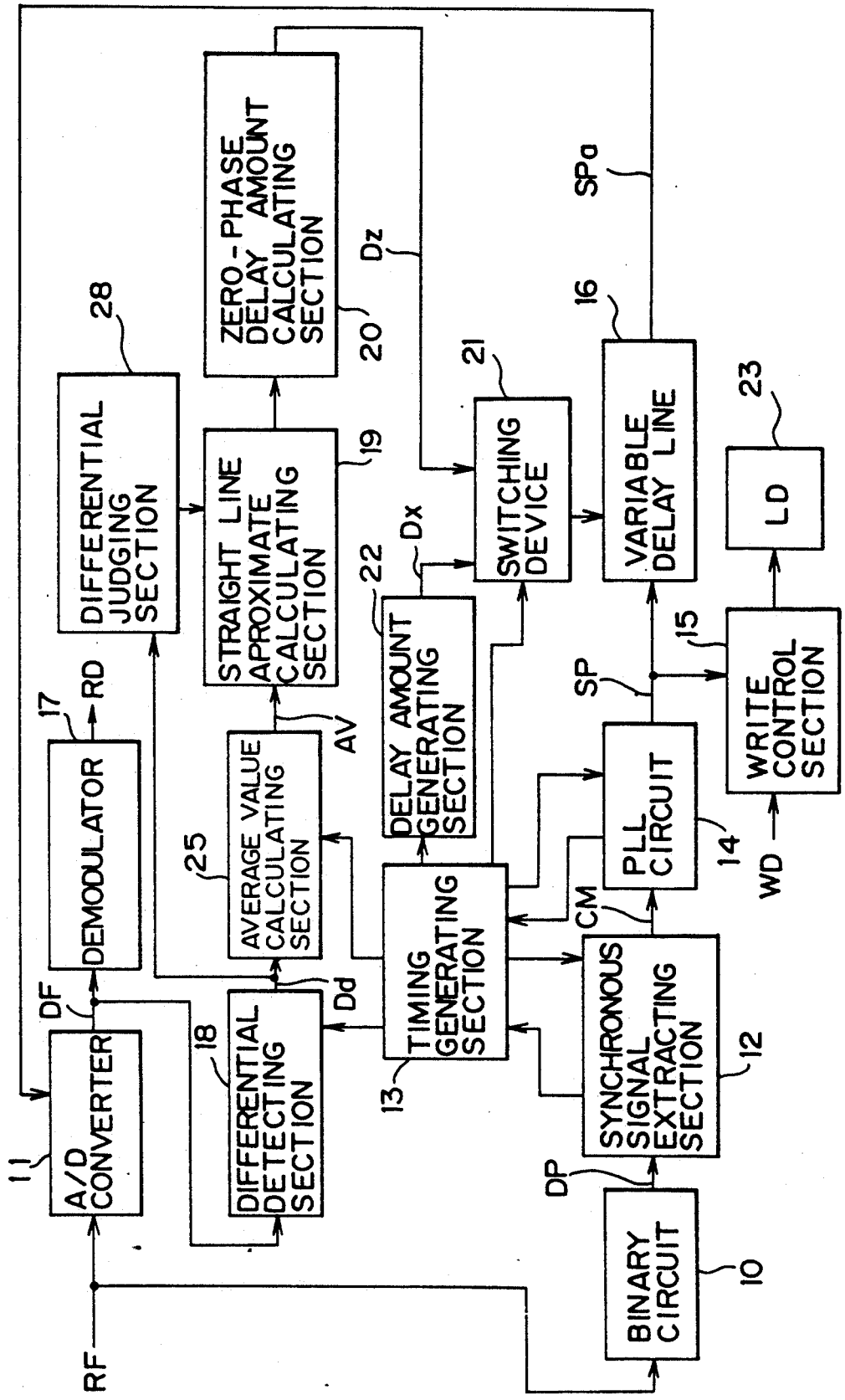
FIG. 19 is a block diagram showing one example of a phase controller in accordance with another embodiment of the present invention.

FIG. 19 shows a phase controller in accordance with another embodiment of the present invention. In FIG. 19, constructional portions equal to or corresponding to those shown in FIGS. 14 and 17 are designated by the same reference numerals.

In FIG. 19, a judging signal SS is outputted from a differential judging section 28 to an average value calculating section 25.

The average value calculating section 25 calculates an average value of a plurality of differential data Dd calculated by a differential detecting section 18 for a period corresponding to one byte of a preamble signal under a condition in which the judging signal SS is inputted from the differential judging section 28 to this average value calculating section 25. The calculated results of the average value calculating section 25 are transmitted to a straight line approximate calculating section 19 as differential average value data AV.

Accordingly, in this embodiment, the differential data Dd judged by the differential judging section 28 as a data value within a predetermined suitable range are used when the differential average value data AV are calculated by the average value calculating section 25. Accordingly, an accuracy in differential average value data AV is improved so that a zero-phase delay amount can be accurately obtained.

In the above embodiment, an accuracy in approximate straight line calculated by the straight line approximate calculating section 19 is improved by directly examining the value of the differential data Dd and extracting the differential data Dd within the suitable range. However, no method for improving the accuracy in approximate straight line is limited to this method.

Figure 20:
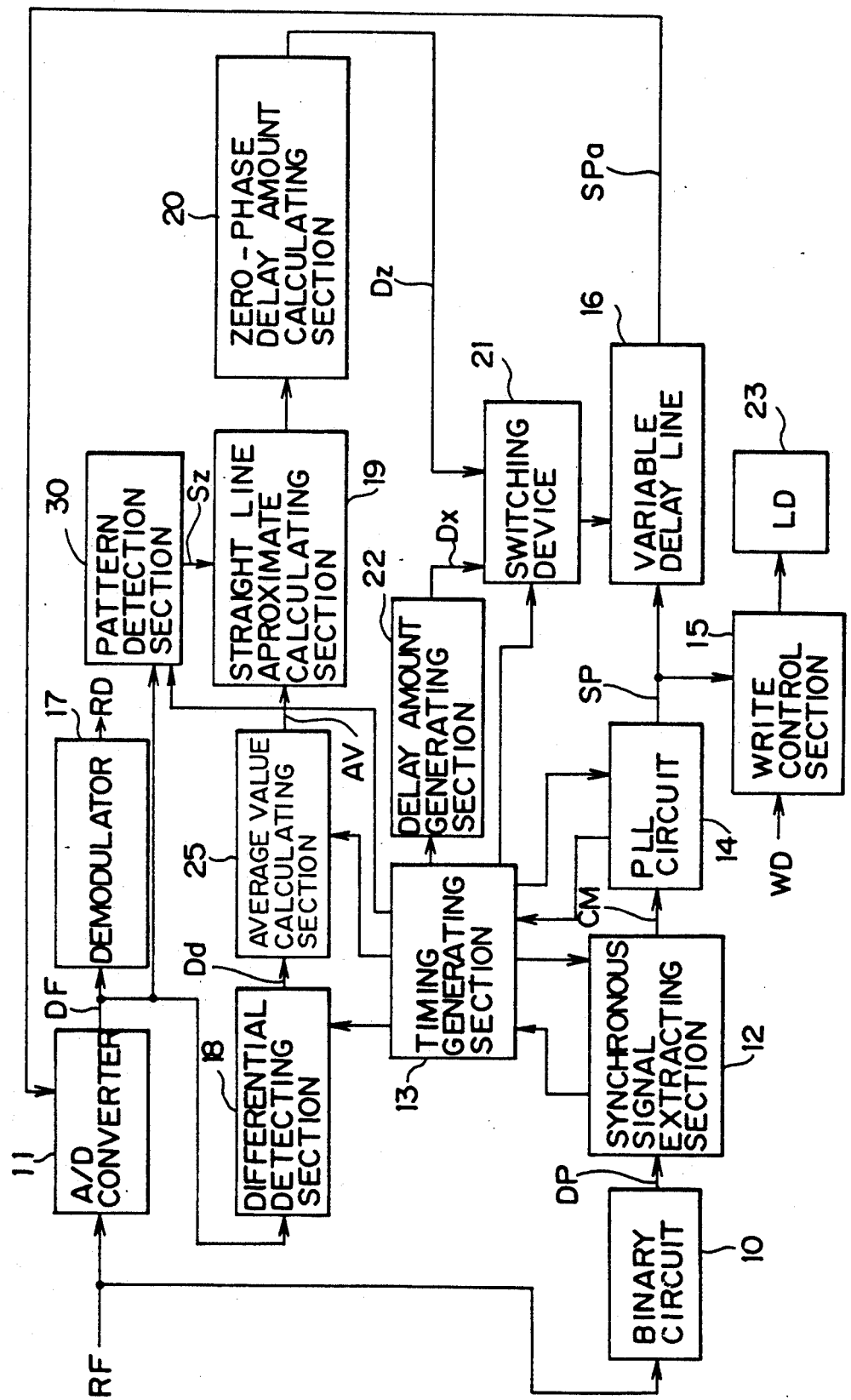
FIG. 20 is a block diagram showing one example of a phase controller in accordance with another embodiment of the present invention.

FIG. 20 shows a phase controller in accordance with another embodiment of the present invention. In FIG. 20, constructional portions equal to or corresponding to those shown in FIG. 14 are designated by the same reference numerals.

In this embodiment, a preamble signal pattern shown by reproducing data DF is detected. When the preamble signal pattern can be detected, it is judged that there is no medium defect in a recording region of a detected preamble signal and the reproducing data DF are suitably obtained.

In FIG. 20, a pattern detecting section 30 detects the preamble signal pattern shown by the reproducing data DF outputted from an analog/digital converter 11. When the preamble signal pattern is detected, the pattern detecting section 30 outputs a detecting signal SZ to a straight line approximating calculating section 19.

The straight line approximate calculating section 19 inputs differential average value data AV outputted from an average value calculating section 25 in a state in which the preamble signal pattern is detected by the pattern detecting section 30. The straight line approximate calculating section 19 calculates the above-mentioned approximate straight line LL and outputs the calculated results thereof to a zero-phase delay amount calculating section 20.

In the above structure, when sector data begin to be read, a timing generating section 13 sets an operating state of a synchronous signal extracting section 12 to a detecting state of a sector mark SM.

Thus, similar to the above-mentioned embodiments, the sector mark SM is detected and a clock mark is also detected so that a phase-synchronizing input operation of a clock mark signal CM with respect to a sampling clock signal SP is completely performed by a PLL circuit 14.

Thus, a switching device 21 selects a delay amount command value Dx by an operation of the timing generating section 13 for a reading period T1 from a starting timing of the detection of a preamble signal to reading of the preamble signal in a state in which a phase of the sampling clock signal SP is synchronized with that of the clock mark signal. Further, the switching device 21 sequentially changes the delay amount command value Dx generated from a delay amount generating section 22 for this reading period T1 by the operation of the timing generating section 13 at a timing at which a period corresponding to one byte of the preamble signal has passed.

Further, the timing generating section 13 starts the operations of a differential detecting section 18 and the pattern detecting section 30. The timing generating section 13 also starts a periodic calculation of the average value calculating section 25 at a timing for changing the delay amount command value Dx.

Thus, a delay amount of the sampling clock signal SP is sequentially changed every period corresponding to one byte of the preamble signal. The differential detecting section 18 calculates a difference between digital reproducing data DF obtained by sampling a reproducing signal RF using sampling clock signals SPa generated before and after the timing of the reproducing signal RF of a recording pit. The differential detecting section 18 calculates this difference with respect to each of delay times. The average value calculating section 25 calculates an average value of differential data Dd at each of the delay times with respect to the reproducing data DF. Differential average value data AV are sequentially outputted from the average value calculating section 25 to the straight line approximate calculating section 19.

When the pattern detecting section 30 detects a preamble signal pattern shown by the reproducing data DF, the pattern detecting section 30 outputs a detecting signal SZ to the straight line approximate calculating section 19. Thus, the straight line approximate calculating section 19 inputs differential average value data AV and calculates an approximate straight line LL in a state in which the detecting signal SZ is inputted to this straight line approximate calculating section 19.

Thus, as mentioned above, only the differential average value data AV obtained for the reading period T1 of the preamble signal and judged as a suitable value are used to calculate the approximate straight line LL in the straight line approximate calculating section 19. The zero-phase delay amount calculating section 20 calculates a zero-phase delay amount by using the calculated results of the approximate straight line LL. The calculating operations of the straight line approximate calculating section 19 and the zero-phase delay amount calculating section 20 are completely performed for at least a time period T2 required to read the next servo area SBA.

When this time period T2 has passed, the switching device 21 selects a zero-phase delay amount command value Dz outputted from the zero-phase delay amount calculating section 20 by an operation of the timing generating section 13. This selected zero-phase delay amount command value Dz is held for a time period T3 from the next data area DTA to the completion of this sector.

Thus, similar to the above-mentioned embodiments, the zero-phase delay amount command value Dz corresponding to the zero-phase delay amount calculated by the zero-phase delay amount calculating section 20 is inputted to a variable delay line 16. Accordingly, a sampling clock signal SPa outputted from the variable delay line 16 is equal to a clock signal provided by delaying the sampling clock signal SP by the zero-phase delay amount. As a result, a demodulator 17 can suitably demodulate the digital reproducing data DF so that reproducing digital data RD are suitably formed.

In this embodiment, the differential average value data AV are inputted to the straight line approximate calculating section 19 and the approximate straight line LL is calculated by using these differential average value data AV only when the operating state of a recording medium is preferable to an extent in which the preamble signal pattern of the reproducing data DF can be normally detected. Namely, the differential average value data AV are inputted to the straight line approximate calculating section 19 and the approximate straight line LL is calculated by using these differential average value data AV only when the differential average value data AV outputted from the average value calculating section 25 can be judged as a normal value. Accordingly, an accuracy in approximate straight line LL is improved so that the reliability of a control amount of the delay time of the sampling clock signal is further improved.

In the above embodiment, the preamble signal pattern shown by the reproducing data DF is detected. When the preamble signal pattern can be detected, it is judged that there is no medium defect in a recording region of a detected preamble signal and the reproducing data DF are suitably obtained. Such a judging operation can be similarly performed when a preamble signal pattern shown by binary data DP is detected.

Figure 21:
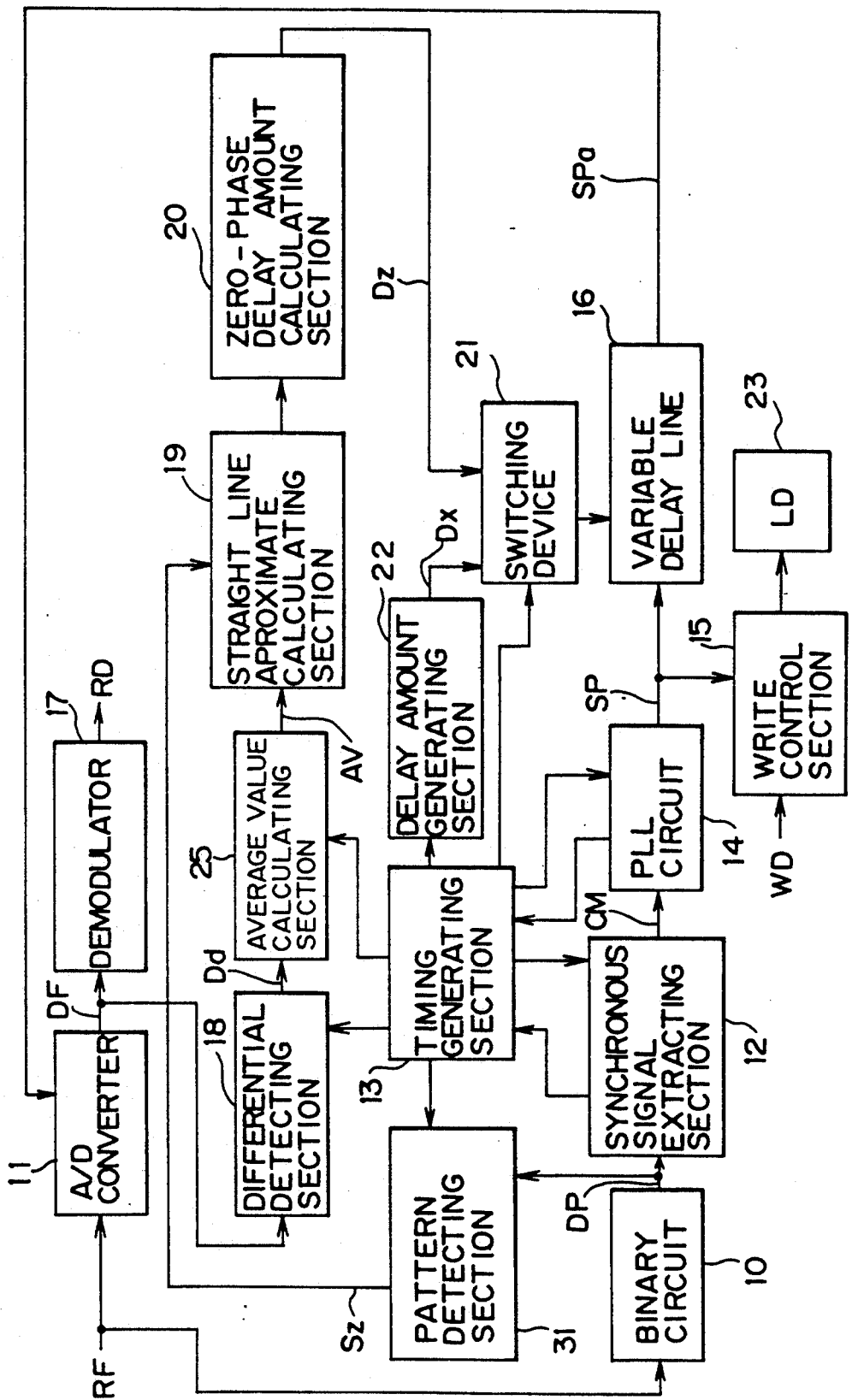
FIG. 21 is a block diagram showing one example of a phase controller in accordance with another embodiment of the present invention.

FIG. 21 shows a phase controller in accordance with another embodiment of the present invention. In FIG. 21, constructional portions equal to or corresponding to those shown in FIG. 20 are designated by the same reference numerals.

In FIG. 21, a pattern detecting section 31 detects a preamble signal pattern shown by binary data DP outputted from a binary circuit 10. When the pattern detecting section 31 detects the preamble signal pattern, the pattern detecting section 31 outputs a detecting signal SZ to a straight line approximate calculating section 19.

The straight line approximate calculating section 19 inputs differential average value data AV outputted from an average value calculating section 25 in a state in which the preamble signal pattern is detected by the pattern detecting section 31. The straight line approximate calculating section 19 calculates the above-mentioned approximate straight line LL and outputs the calculated results thereof to a zero-phase delay amount calculating section 20.

Accordingly, in this embodiment, similar to the above-mentioned embodiments, a demodulator 17 can suitably demodulate digital reproducing data DF and the reliability of a control amount of the delay time of a sampling clock signal is improved.

Figure 22:
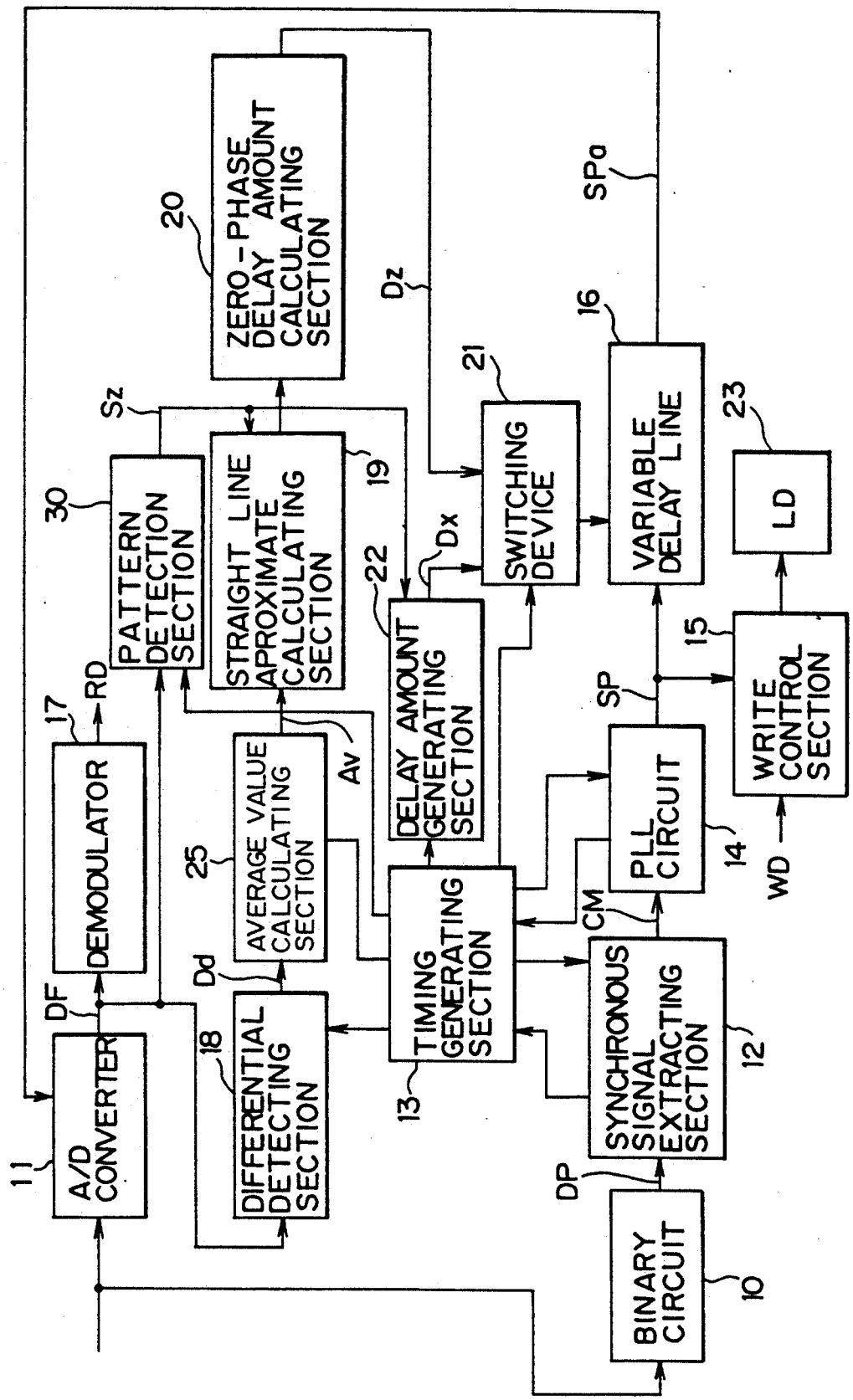
FIG. 22 is a block diagram showing one example of a phase controller in accordance with another embodiment of the present invention.

FIG. 22 shows a phase controller in accordance with another embodiment of the present invention. In FIG. 22, constructional portions equal to or corresponding to those shown in FIG. 20 are designated by the same reference numerals.

In FIG. 22, a pattern detecting section 30 detects a preamble signal pattern shown by reproducing data DF outputted from an analog/digital converter 11. When the preamble signal pattern is detected, the pattern detecting section 30 outputs a detecting signal SZ to a straight line approximating calculating section 19 and a delay amount generating section 22.

The straight line approximate calculating section 19 inputs differential average value data AV outputted from an overage value calculating section 25 in a state in which the preamble signal pattern is detected by the pattern detecting section 30. The straight line approximate calculating section 19 calculates the above-mentioned approximate straight line LL and outputs the calculated results thereof to a zero-phase delay amount calculating section 20.

The delay amount generating section 22 generates a delay amount command value Dx for assigning a delay amount of a variable delay line 16. When a mode for changing the delay amount command value Dx is set by commands of a timing generating section 13, the delay amount generating section 22 changes the delay amount command value Dx to the next value every period corresponding to one byte of a preamble signal under a condition in which a detecting signal SZ is inputted to the delay amount generating section 22. This delay amount command value Dx is transmitted to one input terminal of a switching device 21.

In the above structure, similar to the above-mentioned embodiments, when sector data begin to be read, a synchronous signal extracting section 12 detects a sector mark SM by an operation of the timing generating section 13. The synchronous signal extracting section 12 also detects a clock mark (pit PC) by the operation of the timing generating section 13. The synchronous signal extracting section 12 further performs a phase-synchronizing output operation of a clock mark signal CM with respect to a sampling clock signal SP by the operation of the timing generating section 13.

Thus, the switching device 21 selects a delay amount command value Dx by the operation of the timing generating section 13 for a reading period T1 from a starting timing of the detection of a preamble signal to reading of the preamble signal in a state in which a phase of the sampling clock signal SP is synchronized with that of the clock mark signal. Further, the switching device 21 sequentially changes the delay amount command value Dx generated from a delay amount generating section 22 for this reading period T1 by the operation of the timing generating section 13 at a timing at which a period corresponding to one byte of the preamble signal has passed.

Further, the timing generating section 13 starts the operations of a differential detecting section 18 and the pattern detecting section 30. The timing generating section 13 also starts a periodic calculation of the average value calculating section 25 at a timing for changing the delay amount command value Dx.

Thus, a delay amount of the sampling clock signal SP is sequentially changed every period corresponding to one byte of the preamble signal. The differential detecting section 18 calculates a difference between digital reproducing data DF obtained by sampling a reproducing signal RF using sampling clock signals SPa generated before and after the timing of the reproducing signal RF of a recording pit. The differential detecting section 18 calculates this difference with respect to each of delay times. The average value calculating section 25 calculates an average value of differential data Dd at each of the delay times with respect to the reproducing data DF. Differential average value data AV are sequentially outputted from the average value calculating section 25 to the straight line approximate calculating section 19.

When the pattern detecting section 30 detects a preamble signal pattern shown by the reproducing data DF, the pattern detecting section 30 outputs a detecting signal SZ to the straight line approximate calculating section 19. Thus, the straight line approximate calculating section 19 inputs the differential average value data AV and calculates an approximate straight line LL in a state in which the detecting signal SZ is inputted to this straight line approximate calculating section 19. Further, the delay amount of the sampling clock signal SP set by the delay amount generating section 22 is sequentially changed every period corresponding to one byte of the next preamble signal after the detecting signal SZ is outputted from the pattern detecting section 30.

Thus, as mentioned above, only the differential average value data AV obtained for the reading period T1 of the preamble signal and judged as a suitable value are used to calculate the approximate straight line LL in the straight line approximate calculating section 19. The zero-phase delay amount calculating section 20 calculates a zero-phase delay amount by using the calculated results of the approximate straight line LL. The calculating operations of the straight line approximate calculating section 19 and the zero-phase delay amount calculating section 20 are completely performed for at least a time period T2 required to read the next servo area SBA.

In this embodiment, when the pattern detecting section 30 detects the preamble signal pattern, the delay amount of the sampling clock signal SP is continuously changed every period corresponding to one byte of the preamble signal. In the other cases, no delay amount of the sampling clock signal SP is changed. Accordingly, it is possible to obtain all sampling data required to make a calculation of the straight line approximate calculating section 19. Therefore, the approximate straight line can be accurately calculated so that an accuracy in zero-phase delay amount is improved.

Figure 23:
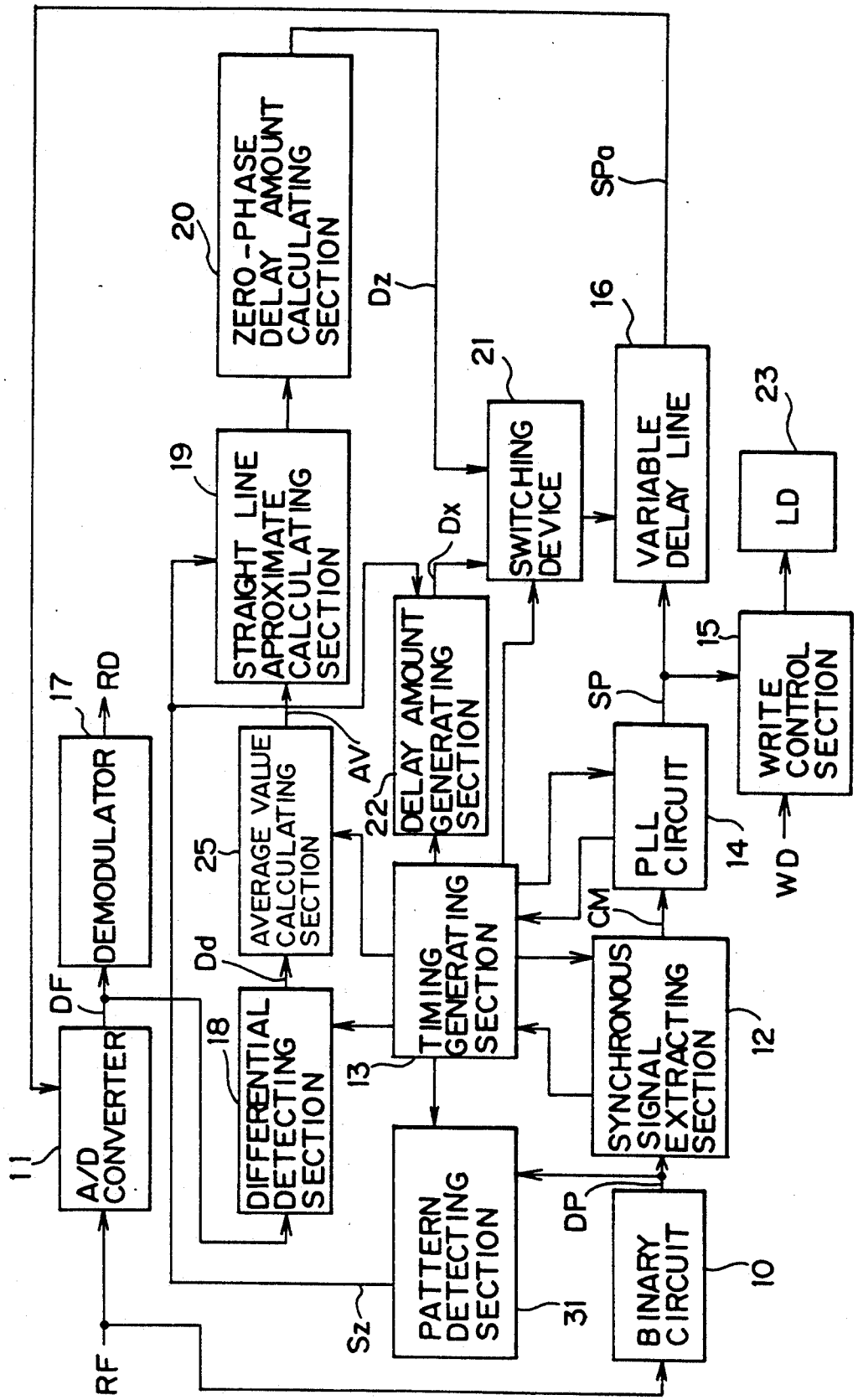
FIG. 23 is a block diagram showing one example of a phase controller in accordance with another embodiment of the present invention.

FIG. 23 shows a phase controller in accordance with another embodiment of the present invention. In FIG. 23, constructional portions equal to or corresponding to those shown in FIG. 21 are designated by the same reference numerals.

In FIG. 23, a pattern detecting section 31 detects a preamble signal pattern shown by binary data DP outputted from a binary circuit 10. When the pattern detecting section 31 detects the preamble signal pattern, the pattern detecting section 31 outputs a detecting signal SZ to a straight line approximate calculating section 19.

The straight line approximate calculating section 19 inputs differential average value data AV outputted from an average value calculating section 25 in a state in which the preamble signal pattern is detected by the pattern detecting section 31. The straight line approximate calculating section 19 calculates the above-mentioned approximate straight line LL and outputs the calculated results thereof to a zero-phase delay amount calculating section 20.

A delay amount generating section 22 generates a delay amount command value Dx for assigning a delay amount of a variable delay line 16. When a mode for changing the delay amount command value Dx is set by commands of a timing generating section 13, the delay amount generating section 22 changes the delay amount command value Dx to the next value every period corresponding to one byte of a preamble signal under a condition in which the detecting signal SZ is inputted to the delay amount generating section 22. This delay amount command value Dx is transmitted to one input terminal of a switching device 21.

In this embodiment, when the pattern detecting section 31 detects the preamble signal pattern, the delay amount of a sampling clock signal SP is continuously changed every period corresponding to one byte of the preamble signal. In the other cases, no delay amount of the sampling clock signal SP is changed. Accordingly, it is possible to obtain all sampling data required to make a calculation of the straight line approximate calculating section 19. Therefore, the approximate straight line can be accurately calculated so that an accuracy in zero-phase delay amount is improved.

The above-mentioned embodiments of the present invention relate to a case in which a recording track of a magnetooptic disk is formed in a concentric shape. However, the present invention can be similarly applied to a case in which the recording track is formed in a spiral shape.

Further, the above-mentioned embodiments of the present invention relate to a case in which the magnetooptic disk is rotated at a constant angular velocity. However, the present invention can be similarly applied to a case using a driving system for switching angular velocities in accordance with an accessed radial position of the magnetooptic disk.

Figure 24:
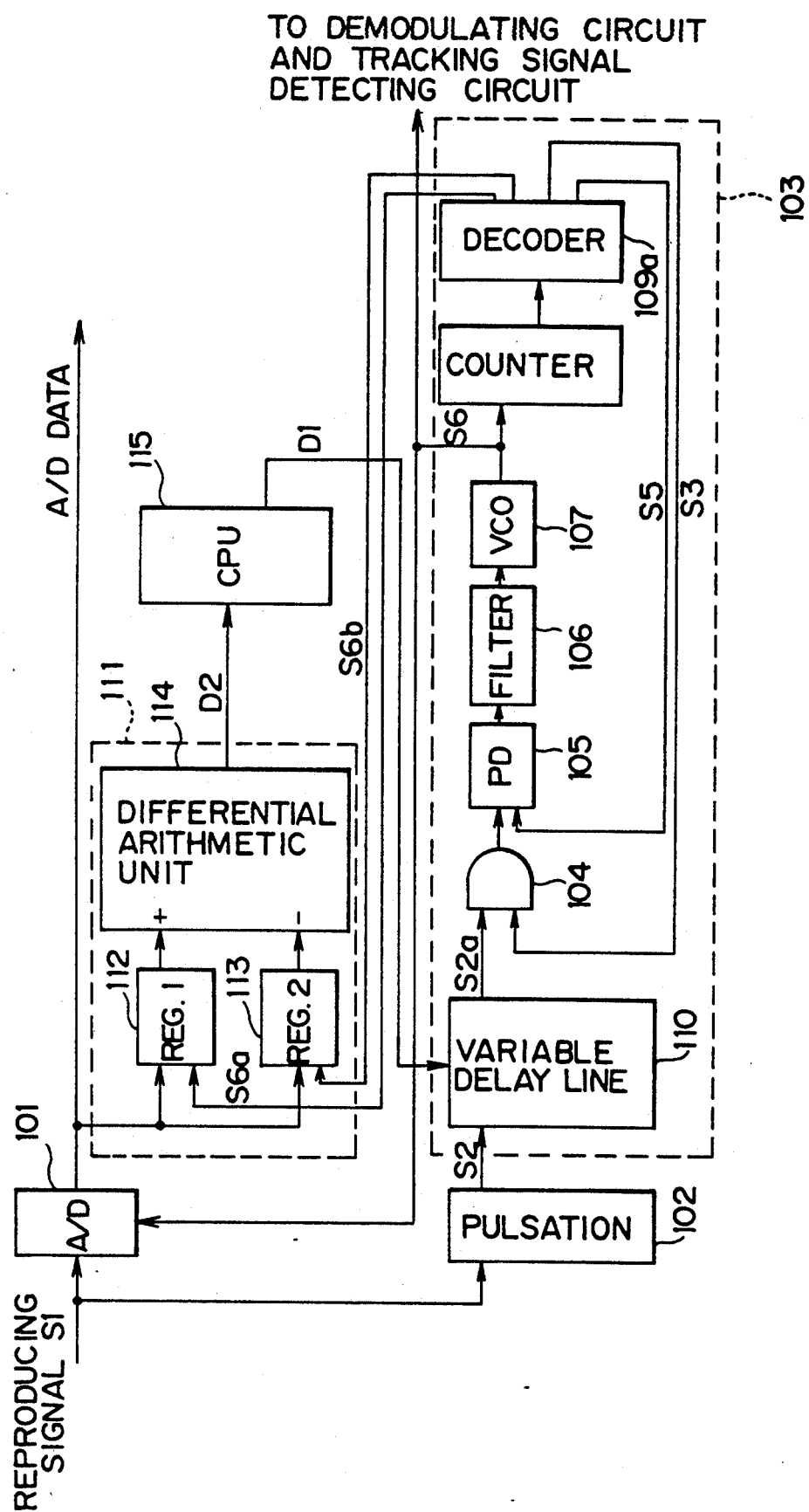
FIG. 24 is a block diagram showing the construction of a recording and reproducing timing generating apparatus in accordance with another embodiment of the present invention.
Figure 33:
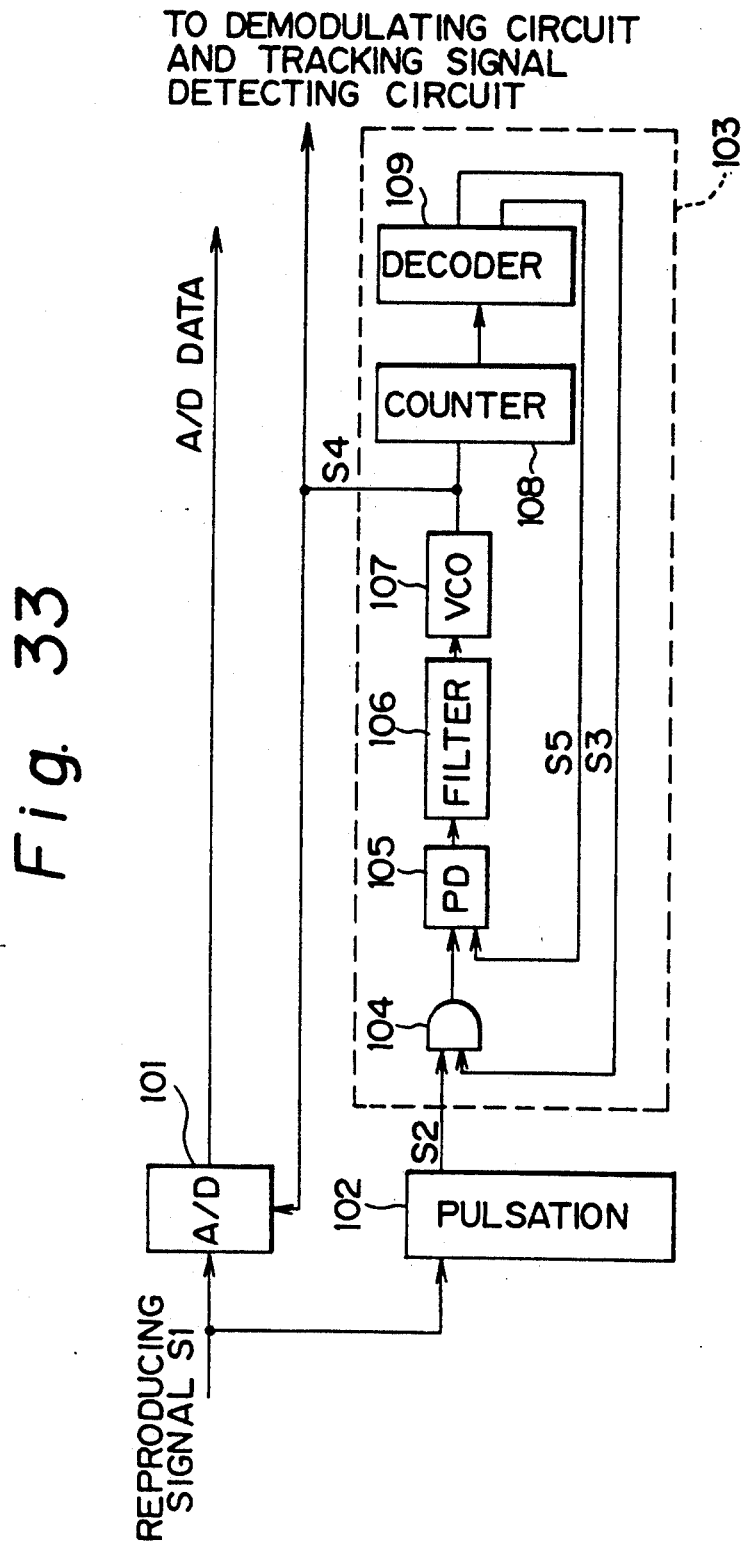
FIG. 33 is a constructional block diagram showing the conventional recording and reproducing timing generating apparatus.

FIG. 24 is a block diagram showing the construction of a recording and reproducing timing generating apparatus in accordance with another embodiment of the present invention. In FIG. 24, constructional portions equal to or corresponding to those shown in FIG. 33 are designated by the same reference numerals. In FIG. 24, a decoder 109a decodes counting data and outputs a window signal S3 and a feedback signal S5 as a timing signal in a predetermined pit position. A sampling timing signal S6 for storing a digital value of a reproducing signal S1 after an analog/digital conversion thereof is outputted from the decoder 109a to each of registers. This sampling timing signal S6 is called an ST signal in the following description.

A variable delay line 110 delays a pulse signal S2. A delay amount of this variable delay line 110 is changed by delay data D1 from a central processing unit (CPU) described later. A differential arithmetic circuit 111 calculates a difference in digital value between reproducing level signals F1 and F3 A/D-converted by clock signals C1 and C3 respectively provided just before and just after a clock pit of a recording/reproducing clock signal S4 shown in FIG. 25 with respect to the reproducing signal S1 shown in FIG. 25.

Figure 25:
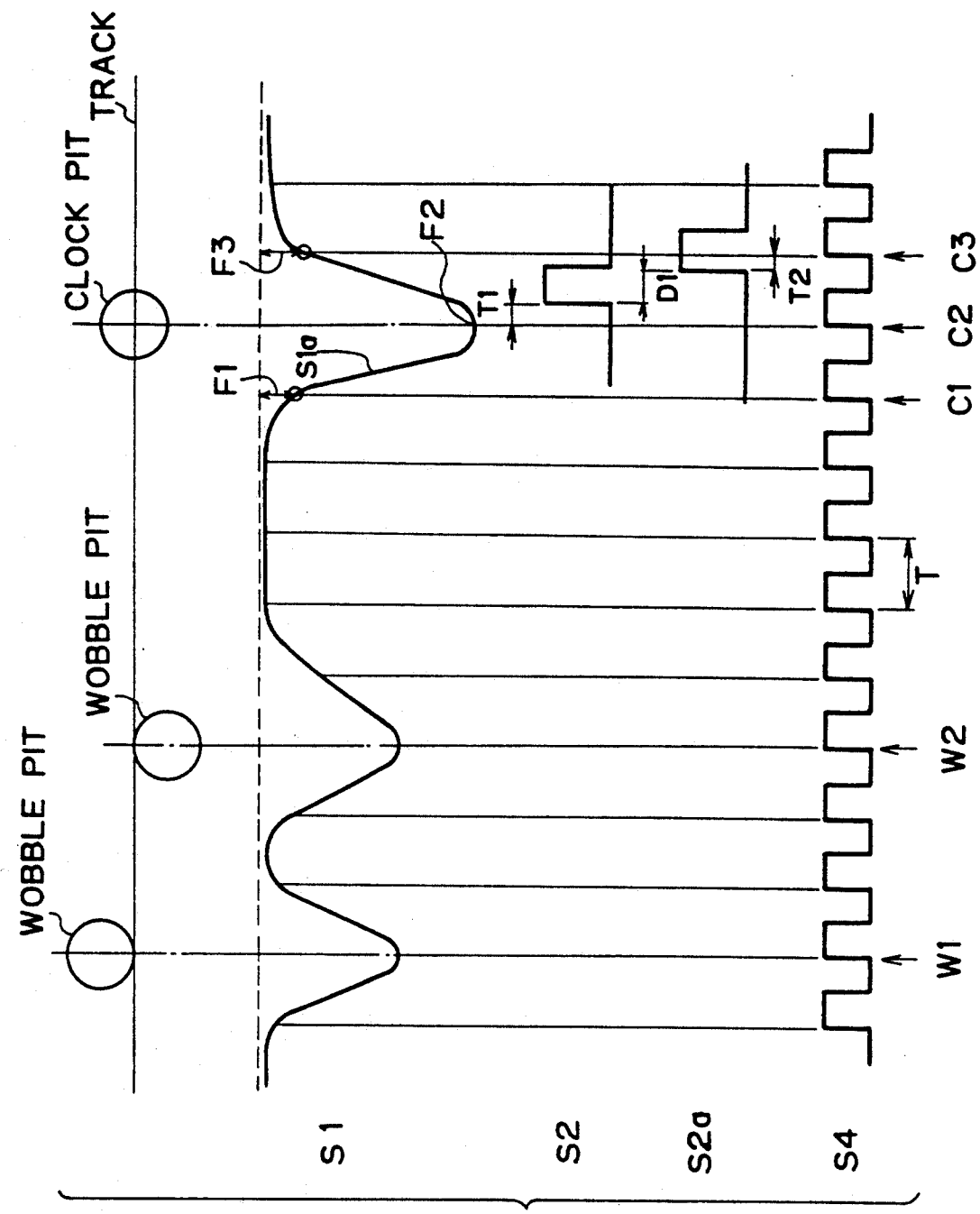
FIG. 25 is a timing chart showing an operating state of a recording/reproducing clock signal provided through a variable delay line.

In this differential arithmetic circuit 111, a register 112 latches digital data of the reproducing level signal F1 A/D-converted by the clock signal C1 just before the above clock pit shown in FIG. 25 on the basis of an ST signal S6a outputted from the decoder 109a. A register 113 latches A/D-converted data corresponding to the reproducing level signal F3 A/D-converted by the clock signal C3 just after the above clock pit on the basis of an ST signal S6b. A clock signal C2 is a clock signal for A/D-converting a reproducing level signal F2 at a bottom (or peak) of the clock pit.

A differential arithmetic unit 114 performs a differential operation of data latched to the two registers 112 and 113 and outputs differential data D2 (=F1-F2) to the CPU 115. The CPU 115 corrects the delay data D1 inputted to the variable delay line 110 based on the differential data D2 from the differential arithmetic unit 114 such that these differential data D2 show value zero.

A phase-correcting operation of the recording/reproducing clock signal in the recording and reproducing timing generating apparatus constructed above will next be described.

Before information is recorded and reproduced, a wobble pit and a clock pit are reproduced by an optical pickup device. A reproducing signal S1 reproduced by the optical pickup device is inputted to an A/D converter 101 and a pulsating circuit 102. With respect to the reproducing signal S1 shown in FIG. 25, a clock pit reproducing signal S1a is changed to a pulse signal S2 delayed by a time T1 from a bottom (or peak) position of the inputted clock pit reproducing signal S1a shown in FIG. 25.

This pulse signal S2 is inputted to a PLL circuit 103 to the variable delay line 110 for delaying the pulse signal S2 in accordance with delay data D1 inputted from the CPU 115. The pulse signal S2 is changed by this variable delay line 110 to a delay pulse signal S2a delayed by a time (T1+D1) from the bottom (or peak) position of the clock pit reproducing signal S1a shown in FIG. 25.

This delay pulse signal S2a is inputted to an AND circuit 104 and is then inputted to a PD 105 by a window signal S3. The PD 105 compares a phase of this delay pulse signal S2a with the phase of a clock signal inputted as a feedback signal S5 and generated by a VCO 107. The PD 105 then detects a difference in phase between these signals and outputs a phase difference signal indicative of this detected phase difference to a filter 106.

The filter 106 outputs a voltage signal based on this phase difference signal to the VCO 107. The VCO 107 corrects the phase of the generated clock signal based on this voltage signal such that the phase of the clock signal is equal to the phase of the delay pulse signal S2a. The VCO 107 then generates a recording/reproducing clock signal S4. This recording/reproducing clock signal S4 generated from the VCO 107 is delayed by a time T2 and is inputted to a counter 108, the A/D converter 101, an unillustrated demodulating circuit, a tracking signal detecting circuit, etc.

The counter 108 counts the number of inputted clock signals and generates and outputs counting data to the decoder 109a. The decoder 109a decodes these counting data and outputs a feedback signal S5 to the PD 105 at a predetermined timing. Further, the decoder 109a outputs a window signal S3 to the AND circuit 104 at a predetermined timing, and outputs ST signals S6a and S6b to the respective registers 112 and 113 at predetermined timings.

With respect to the reproducing signal S1 inputted and A/D-converted by the A/D converter 101, the register 112 latches digital data of a reproducing level signal F1 A/D-converted by the clock signal C1 just before the above clock pit shown in FIG. 25. The register 112 latches these digital data of the reproducing level signal F1 by the ST signal S6a from the decoder 109a. The register 113 latches digital data of a reproducing level signal F3 A/D-converted by the clock signal C3 just after the above clock pit shown in FIG. 25. The register 113 latches these digital data of the reproducing level signal F3 by the ST signal S6b from the decoder 109a. In consideration of a signal delay amount provided by the recording and reproducing timing generating apparatus, each of the clock signals C1 to C3 for A/D-converting the reproducing signal is set in advance to a clock signal shifted by one clock from a clock signal used when there is no signal delay.

Figure 26C:
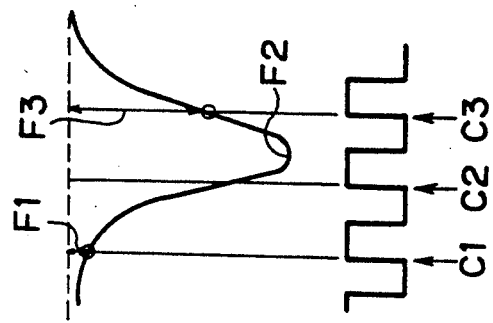
FIG. 26 is a view showing the relation between the recording/reproducing clock signal and a reproducing level signal of a clock pit.
Figure 26B:
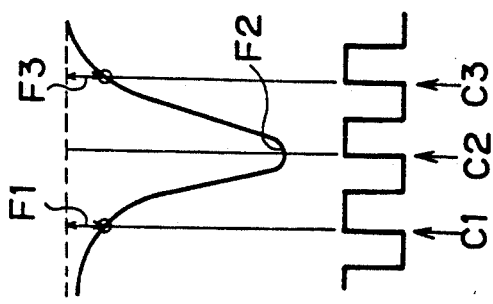
Figure 26A:
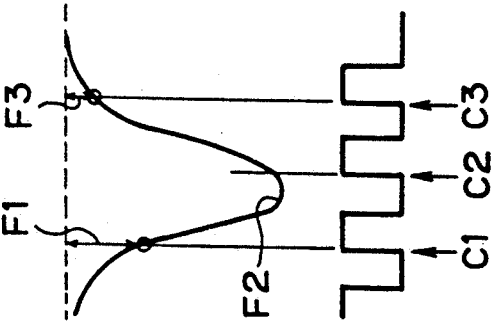

The relation between the recording/reproducing clock signal S4 and the reproducing level signals F1 and F3 with respect to the clock signals C1 and C3 just before and just after the above clock pit is provided as shown in FIG. 26a when each of the clock signals C1 to C3 for A/D-converting the reproducing signal has a phase difference on a time delay side with respect to a bottom (or peak) position of the clock pit reproducing signal S1a. In this case, no reproducing level signal F1 with respect to the clock signal C1 just before the clock pit is equal to the reproducing level signal F3 with respect to the clock signal C3 just after the clock pit. Namely, a voltage level of the reproducing level signal F1 is smaller than that of the reproducing level signal F3 (F1<F3).

FIG. 26b illustrates a case in which the bottom (or peak) position of the clock pit reproducing signal S1a is in conformity with the position of the clock signal C2 with respect to phase. In this case, F1=F3 is formed. FIG. 26c illustrates a case in which each of the clock signals C1 to C3 has a phase difference on a time advancing side with respect to the bottom (or peak) position of the clock pit reproducing signal S1a. In this case, the voltage level of the reproducing level signal F1 is greater than that of the reproducing level signal F3 (F1>F3).

No voltage level of the reproducing level signal F1 is equal to that of the reproducing level signal F3 when there is a difference in phase between the clock signals C1 to C3 for A/D conversion and a bottom (or peak) position reproducing signal S1 of the clock pit reproducing signal S1a. Namely, no voltage level of the reproducing level signal F1 is equal to that of the reproducing level signal F3 when there is a difference in phase between the recording/reproducing clock signal S4 and the reproducing signal S1.

Figure 27:
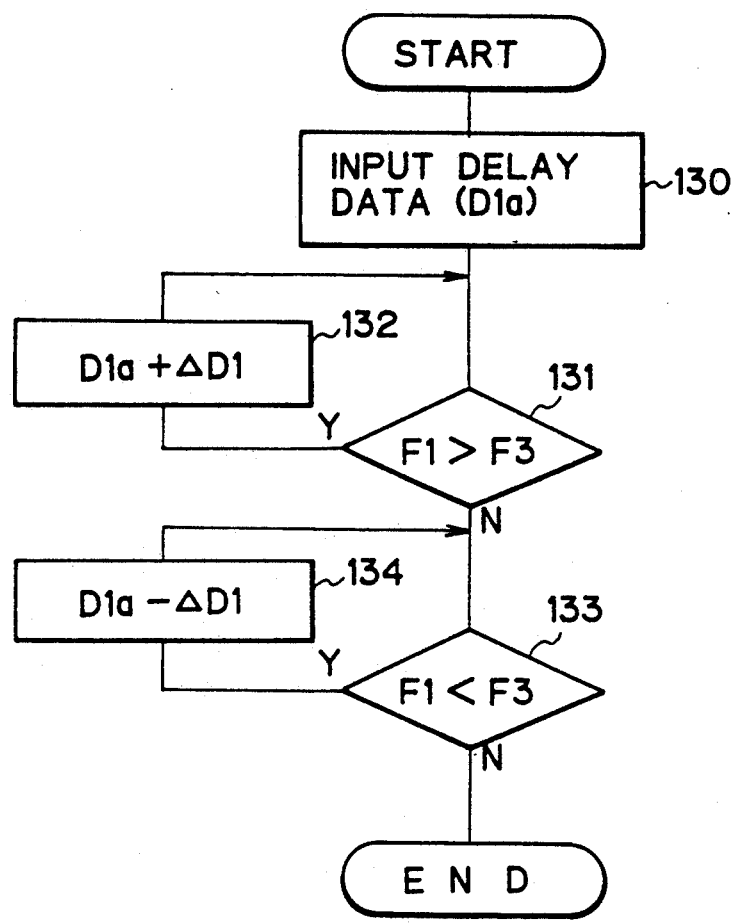
FIG. 27 is a flow chart for providing delay data in which differential data show value zero.

Therefore, in accordance with a flow chart shown in FIG. 27, the CPU 115 calculates a value of the delay data D1 for providing differential data D2 which show value zero and correspond to a difference between data provided and latched to the differential arithmetic unit 114. Namely, the CPU 115 calculates a value of the delay data D1 for forming F1=F3.

First, predetermined delay data D1a provided for a time shorter than a time T of one clock with respect to the recording/reproducing clock signal S4 shown in FIG. 25 are inputted from the CPU 115 to the variable delay line 110 in a processing step 130. A delay amount of the variable delay line 110 at this time is set to G1. F1=F3 is formed when the differential data D2 show value zero as shown in FIG. 26b. When F1=F3 is formed, the delay data D1 are set to D1b and the delay amount of the variable delay line 110 is set to G2.

Figure 28:
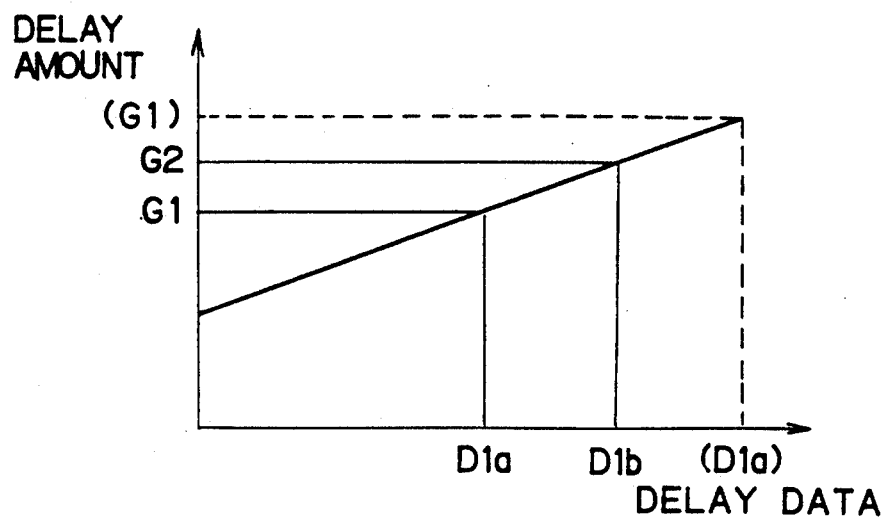
FIG. 28 is a graph showing the relation between the delay data and a delay amount.

For example, when G2>G1 is formed as shown in FIG. 28, the delay amount of the recording/reproducing clock signal S4 is small with respect to the predetermined delay data D1a. Therefore, the recording/reproducing clock signal S4 has a phase difference on the time advancing side with respect to the pulse signal S2. In this state, when the voltage values of the reproducing level signals F1 and F3 are compared with each other in a processing step 131 in FIG. 27, F1>F3 is formed as shown in FIG. 26c so that the judgment in the step 131 is YES.

In this case, the CPU 115 detects that the differential data D2 shows a positive value, thereby increasing the above delay amount. Accordingly, data ΔD1 are added to the delay data D1a in a processing step 132 to reduce the value of the differential data D2 and provide the delay data D1 for setting the differential data D2 to value zero.

F1<F3 is formed when the recording reproducing clock signal S4 has a phase difference on the time delay side with respect to the pulse signal S2 as shown in FIG. 26a. When F1<F3 is formed, the judgment in a processing step 133 is YES. In this case, the CPU 115 detects that the differential data D2 shows a negative value, thereby reducing the above delay amount. Accordingly, the data ΔD1 are subtracted from the delay data D1a in a processing step 134. Thus, the value of the differential data D2 is increased to provide the delay data D1 for setting the differential data D2 to value zero.

Accordingly, the phase of a pulse signal transmitted through the variable delay line is changed by changing the delay amount of the variable delay line so that the phase of the clock pit reproducing signal S1a in the bottom (or peak) position thereof and the phase of the recording/reproducing clock signal S4 can be conformed to each other.

The recording and reproducing timing generating apparatus in this embodiment corrects the phase difference based on one differential data. Accordingly, when there is a defect in a clock pit, etc., the recording and reproducing timing generating apparatus corrects the phase difference based on incorrect differential data so that no information can be suitably recorded and reproduced.

A recording and reproducing timing generating apparatus for solving such a problem in accordance with another embodiment of the present invention will next be described.

Figure 29:
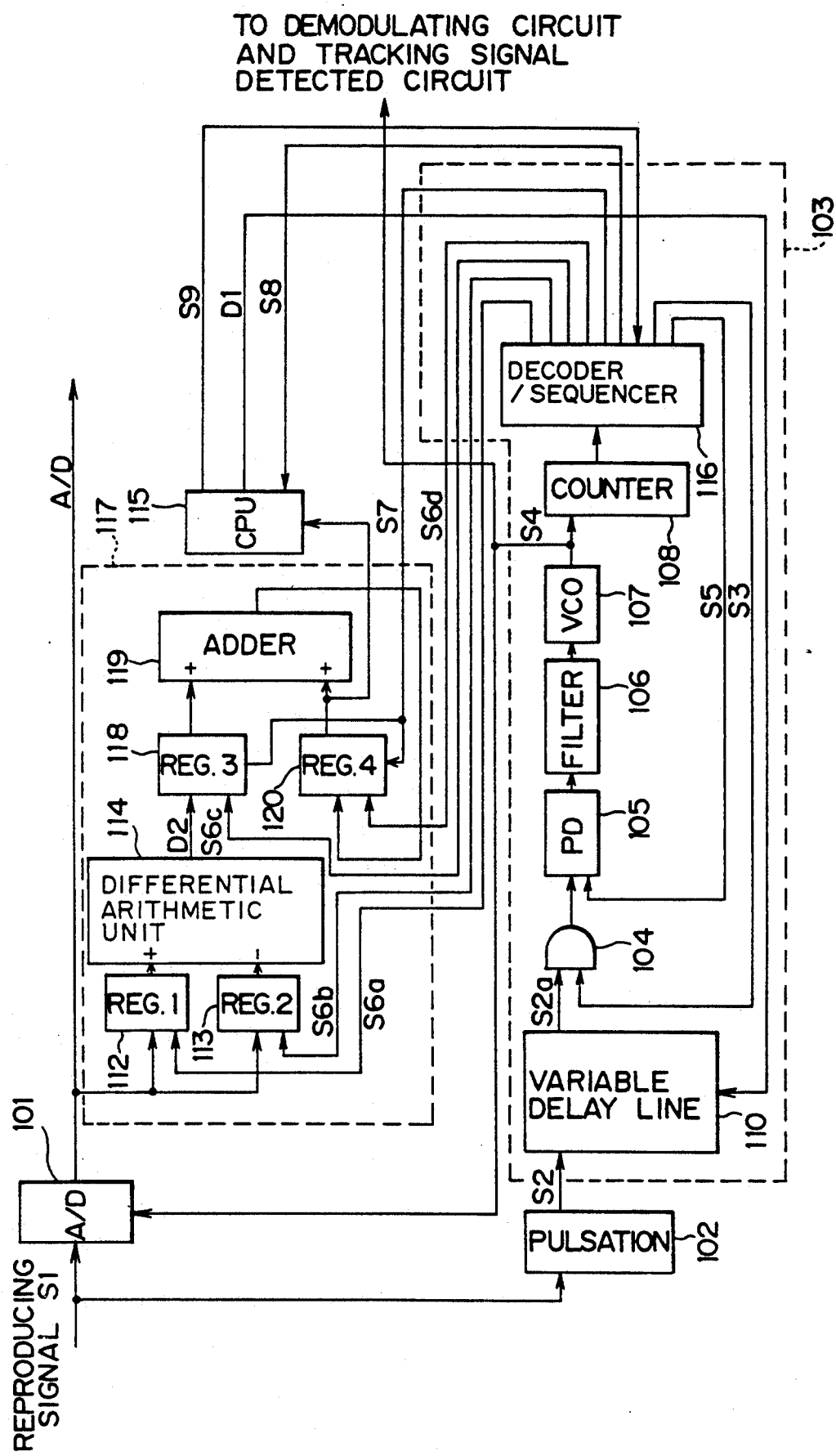
FIG. 29 is a block diagram showing the construction of a recording and reproducing timing generating apparatus in accordance with another embodiment of the present invention.

FIG. 29 is a block diagram showing the construction of a recording and reproducing timing generating apparatus in accordance with another embodiment of the present invention. In FIG. 29, constructional portions equal to or corresponding to those shown in FIG. 24 are designated by the same reference numerals.

In FIG. 29, a decoder/sequencer 116 decodes counting data and outputs a window signal S3, a feedback signal S5 and an ST signal S6 at predetermined timings. The decoder/sequencer 116 further outputs a clearing signal S7 with respect to a register for latching differential data D2. The decoder/sequencer 116 further outputs a differential integrating value output signal S8 for outputting a differential integrating value to a CPU 115. The decoder/sequencer 116 further outputs an operation completing signal S9 to the CPU 115 after a correcting operation of delay data D1 is completely performed.

A differential integrating circuit 117 integrates the differential data D2 a predetermined number of times and calculates an average value of the integrated differential data D2. In the differential integrating circuit 117, a register 118 latches the differential data D2 outputted from a differential arithmetic unit 114 based on an ST signal S6c from the decoder/sequencer 116. An adder 119 adds the differential data D2 to each other. A register 120 latches the added results of this adder 119 based on an ST signal S6d from the decoder/sequencer 116.

A phase-correcting operation of a recording/reproducing clock signal in the above recording and reproducing timing generating apparatus will next be described with reference to timing charts shown in FIGS. 30 and 31. These timing charts relate to a case in which a clock pit in a servo area is continuously reproduced eight times without changing delay data D1a set by the CPU 115 and the differential data D2 are integrated with each other.

Figure 30:
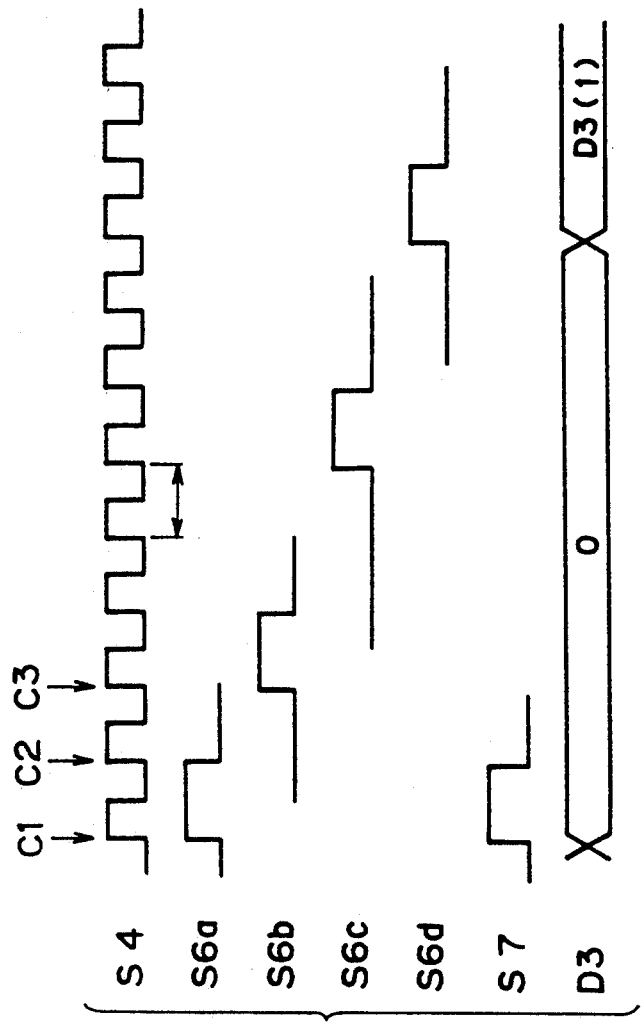
FIG. 30 is a timing chart showing a first integrating operation of differential data.
Figure 31:
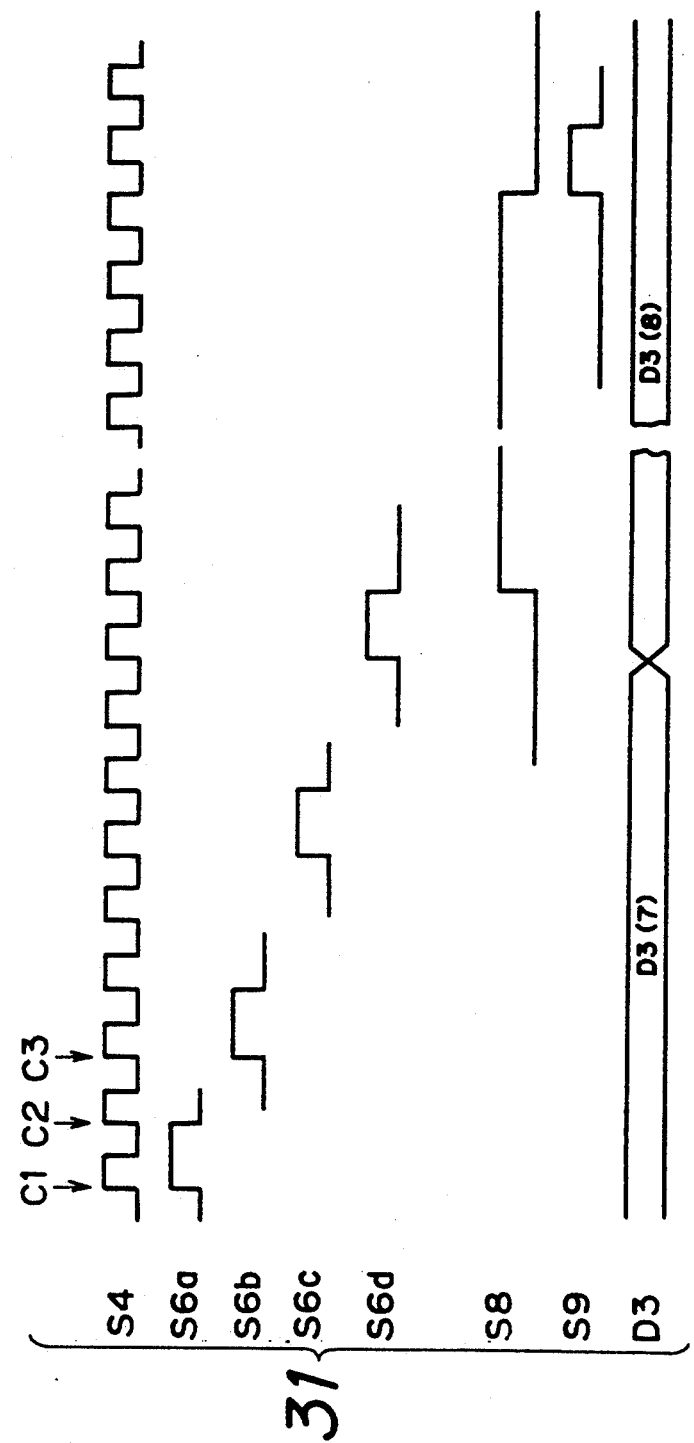
FIG. 31 is a timing chart showing an eighth integrating operation of differential data and an operation for outputting a differential integrating value.
Figure 32:
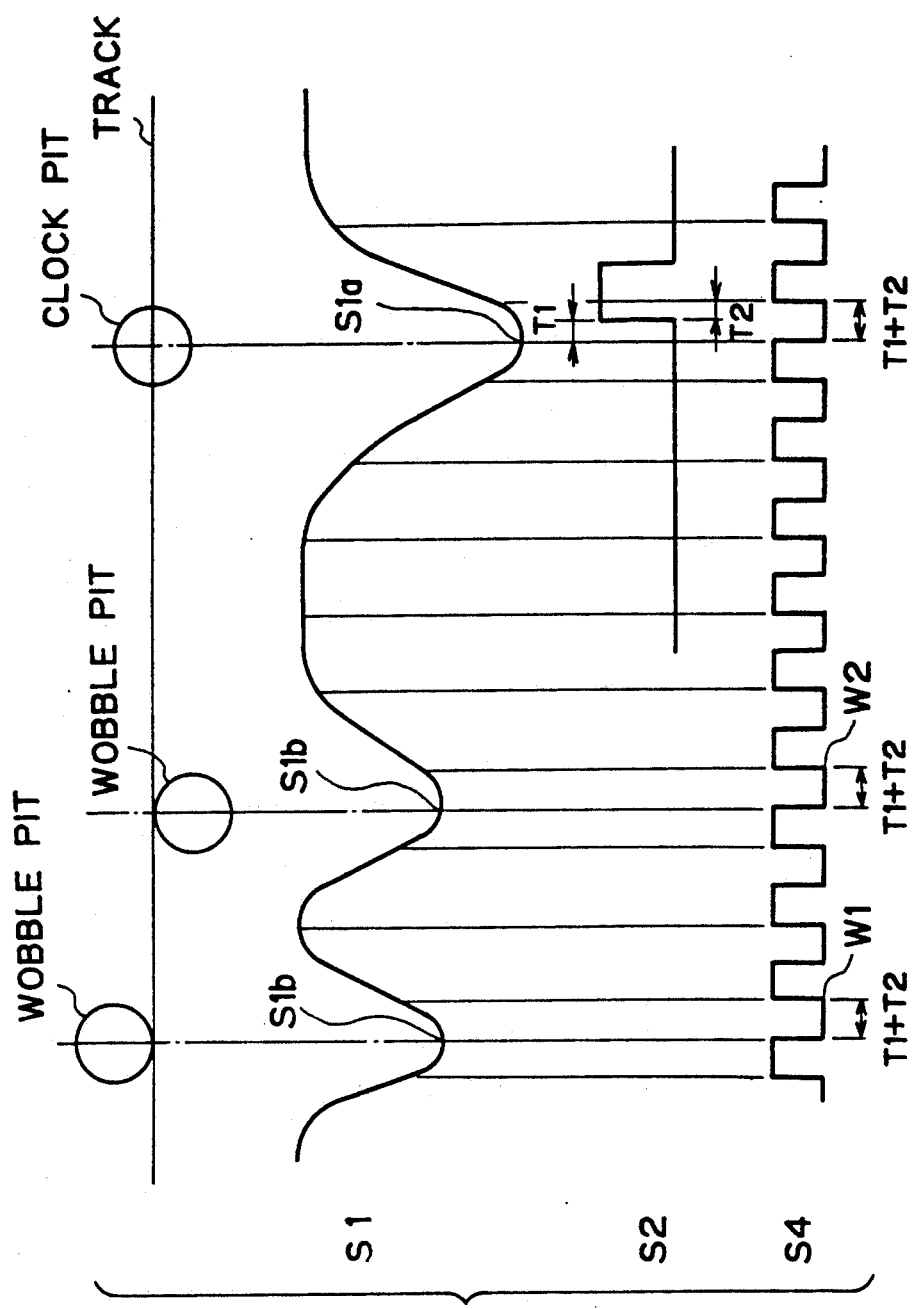
FIG. 32 is a timing chart showing an operating state of a recording/reproducing clock signal in a conventional recording and reproducing timing generating apparatus.

First, delay data D1a provided for a time shorter than a time T of one clock with respect to a recording/reproducing clock signal S4 shown in FIG. 30 are inputted from the CPU 115 to a variable delay line 110. A value of these delay data D1a is held by the CPU 115 for a period for integrating differential data with each other.

In a first integration, the registers 118 and 120 are cleared by a clearing signal S7 from the decoder/sequencer 116 shown in FIG. 30. Further, a differential integrating value D3 latched to the register 120 is set to zero as shown in FIG. 30.

Simultaneously, the register 112 latches digital data of a reproducing level signal F1 A/D-converted by a clock signal C1 just before a first clock pit. The register 112 latches these digital data of the reproducing level signal F1 by an ST signal S6a from the decoder/sequencer 116 shown in FIG. 30. Next, the register 113 latches digital data of a reproducing level signal F3 A/D-converted by a clock signal C3 just after the first clock pit. The register 113 latches these digital data of the reproducing level signal F3 by an ST signal S6b from the decoder/sequencer 116 shown in FIG. 30.

These two latched data are substracted from each other by a subtracter 114, thereby obtaining first differential data D2. These differential data D2 are latched to the register 118 by an ST signal S6c shown in FIG. 30. An output of the register 118 is added to a first output of the register 120 by the adder 119. The first output of the register 120 shows value zero so that the added results of the adder 119 are equal to the output of the register 118.

An added value of the adder 119 is latched to the register 120 by an ST signal S6d shown in FIG. 30. Thus, a first differential integrating value D3 (1) shown in FIG. 30 is latched to the register 120.

In a second integration, similar to the first integration, differential data D2 obtained by reproducing a second clock pit are latched to the register 118 by the ST signal S6c. In the adder 119, these differential data D2 are added to the first differntial data D2 latched to the register 120. The added results of the adder 119 are latched to the register 120 by the ST signal S6d. Thus, a differential integrating value D3 (2) of the differential data D2 at the first and second integrations is latched to the register 120.

Such an integration is further repeatedly performed six times. When the eighth integrating operation is completely performed, as shown in FIG. 31, a differential integrating value output signal S8 for outputting a differential integrating value D3 (8) is outputted from the decoder/sequencer 116 to the CPU 115. The decoder/sequencer 116 outputs no clearing signal during the integration of the differential data. Accordingly, the differential integrating value D3 (8) shown in FIG. 31 and obtained in the eight integrations is latched to the register 120 as it is.

When the CPU 115 detects the differential integrating value output signal S8, the CPU 115 reads the differential integrating value D3 (8) obtained in the eight integrations and latched to the register 120. The CPU 115 then calculates an average value of the differential integrating value D3 (8) and corrects the delay data D1a already outputted. The differential integrating value output signal S8 rises during a correcting period of the delay data D1a corrected by the CPU 115. However, when this correcting operation is completed, the differential integrating value output signal S8 falls by an operation completing signal S9 generated from the decoder/sequencer 116 to prepare the next integrating operation.

The CPU 115 can provide the delay data D1 for setting such a calculated average value of the differential data D2 to zero in accordance with the above flow chart shown in FIG. 27.

Thus, the phase of a pulse signal transmitted through the variable delay line is changed by changing a delay amount of the variable delay line such that the average value of the differential data is equal to zero. Accordingly, it is possible to conform a phase of the recording/reproducing clock signal S4 to that of the clock pit reproducing signal S1a in a bottom (or peak) position thereof.

Many widely different embodiments of the present invention may be constructed without departing from the spirit and scope of the present invention. It should be understood that the present invention is not limited to the specific embodiments described in this specification, except as defined in the appended claims.

What is claimed is:

1. A recording and reproducing timing generating apparatus for controlling the phase of a sampling clock signal of reproducing data by a sampling servo system in which a servo pattern including a clock mark is recorded to a memory medium at a constant interval, said generating apparatus controlling a delay time of the sampling clock signal based on a level of a reproducing signal sampled by the sampling clock signal;

said generating apparatus comprising:
delay data generating means for outputting a set value of the delay time of the sampling clock signal;
differential data detecting means for detecting a difference in signal level between the reproducing data obtained at timings of sampling clock signals before and after a recording pit of the servo pattern; and
control means for controlling the delay time of the sampling clock signal generated from said delay data generating means such that a detecting value of the differential data detecting means is set to a local minimum value.

2. A recording and reproducing timing generating apparatus for controlling the phase of a sampling clock signal of reproducing data by a sampling servo system in which a servo pattern including a clock mark is recorded to a memory medium at a constant interval, said generating apparatus controlling a delay time of the sampling clock signal based on a level of a reproducing signal sampled by the sampling clock signal;

said generating apparatus comprising:
preamble recording means for recording a preamble signal constructed by a predetermined bit pattern in which there is no recording pit before and after at least one clock before recording data;
delay data generating means for outputting a set value of the delay time of the sampling clock signal;
differential data detecting means for detecting a difference in signal level between the reproducing data obtained at timings of sampling clock signals before and after the recording pit of the preamble signal; and
control means for switching the delay time of the sampling clock signal by sequentially switching the set value of the delay time outputted from said delay data generating means when the preamble signal is detected;
said control means including means for calculating an optimum delay amount of the sampling clock signal based on differential data detected by said differential data detecting means; and
means for setting the delay amount of the sampling clock signal to the calculated optimum delay amount after the preamble signal is detected.

3. A recording and reproducing timing generating apparatus according to claim 2, further comprising:
differential data average value calculating means for calculating an average value of differential data detected by the differential data detecting means with respect to a predetermined number of sampling clock signals; and wherein
said control means switches the delay time of the sampling clock signal by sequentially switching the set value of the delay time outputted from said delay data generating means in a unit of the predetermined number of sampling clock signals when the preamble signal is detected;
said differential data average value calculating means calculates said average value by a control operation of the control means in accordance with a switching timing of the set value of the delay time; and
the control means calculates an optimum delay amount of the sampling clock signal based on the average value of the differential data calculated by said differential data average value calculating means.

4. A recording and reproducing timing generating apparatus according to claim 2, further comprising:
differential data judging means for judging that a value shown by differential data outputted from the differential data detecting means is located in a predetermined range; and wherein
said control means calculates an optimum delay amount of the sampling clock signal based on differential data outputted from said differential data detecting means when there is a judging output from said differential data judging means.

5. A recording and reproducing timing generating apparatus according to claim 2, further comprising:
differential data judging means for judging that a value shown by differential data outputted from the differential data detecting means is located in a predetermined range; and wherein
said control means switches the delay time of the sampling clock signal by sequentially switching the set value of the delay time outputted from said delay data generating means when the preamble signal is detected and there is a judging output from said differential data judging means.

6. A recording and reproducing timing generating apparatus according to claim 3, further comprising:
differential data judging means for judging that a value shown by differential data outputted from said differential data detecting means is located in a predetermined range; and wherein
said differential data average value calculating means calculates said average value by a control operation of the control means in accordance with a switching timing of the set value of the delay time when there is a judging output from said differential data judging means;

7. A recording and reproducing timing generating apparatus according to claim 3, further comprising:
differential data judging means for judging that a value shown by differential data outputted from said differential data detecting means is located in a predetermined range; and wherein
said control means switches the delay time of the sampling clock signal by sequentially switching the set value of the delay time outputted from said delay data generating means in a unit of the predetermined number of sampling clock signals when the preamble signal is detected and there is a judging output from said differential data judging means.

8. A recording and reproducing timing generating apparatus according to claim 3, further comprising:
pattern detecting means for detecting said preamble signal pattern shown by the reproducing data; and wherein said differential data average value calculating means calculating said average value by a control operation of the control means in accordance with a switching timing of the set value of the delay time when there is a detecting output from said pattern detecting means;

9. A recording and reproducing timing generating apparatus according to claim 3, further comprising:

pattern detecting means for detecting said preamble signal pattern shown by the reproducing data; and wherein said control means switching the delay time of the sampling clock signal by sequentially switching the set value of the delay time outputted from said delay data generating means in a unit of the predetermined number of sampling clock signals when the preamble signal is detected and there is a detecting output from said pattern detecting means.

10. A recording and reproducing timing generating apparatus according to claim 8, wherein said pattern detecting means detects said preamble signal pattern shown by a binary signal obtained by binary processing of the reproducing signal.

11. A recording and reproducing timing generating apparatus according to claim 9, wherein said pattern detecting means detects said preamble signal pattern shown by a binary signal obtained by binary processing of the reproducing signal.

12. A recording and reproducing timing generating apparatus comprising:

an A/D converter for A/D-converting a reproducing signal of a pit for detecting recording and reproducing timings and recorded in advance at a constant interval in a track of an optical disk;

a pulsating circuit for pulsating the reproducing signal of said pit and generating a pulse signal; and a synchronous signal generating circuit for generating a recording/reproducing clock signal synchronized with said pulse signal;

said generating apparatus further comprising:

a variable delay section for delaying said pulse signal;

a differential arithmetic circuit for calculating a difference in value between reproducing signals A/D-converted by recording/reproducing clock signals just before and just after said pit; and a control section for correcting a delay amount of the pulse signal in said variable delay section based on calculated results of said differential arithmetic circuit such that said difference is equal to zero.

13. A recording and reproducing timing generating apparatus as claimed in claim 12, wherein said generating apparatus further comprises a differential integrating circuit for calculating the difference in value between the reproducing signals A/D-converted by the recording/reproducing clock signals just before and just after said pit, and the differential integrating circuit calculates this difference by a plurality of times and integrates the calculated differential results with each other; and the control section calculates an average value of the calculated differential results of said differential integrating circuit and corrects the delay amount of said variable delay section such that this average value is set to zero.

* * * * *